(12) United States Patent
Itoi et al.

(10) Patent No.: US 8,060,918 B2
(45) Date of Patent: Nov. 15, 2011

(54) METHOD AND SYSTEM FOR VERIFYING IDENTITY

(75) Inventors: Masayuki Itoi, Tokyo (JP); Tomokazu Takagawa, Kanagawa (JP)

(73) Assignee: Safety Angle Inc., Ishikawa-shi (JP)

( * ) Notice: Subject to any disclaimer, the term of this patent is extended or adjusted under 35 U.S.C. 154(b) by 1169 days.

(21) Appl. No.: 10/284,799

(22) Filed: Oct. 30, 2002

(65) Prior Publication Data

US 2003/0204725 A1 Oct. 30, 2003

(30) Foreign Application Priority Data

Apr. 26, 2002 (JP) ................................ 2002-126933

(51) Int. Cl.
*H04L 9/32* (2006.01)
*H04L 9/08* (2006.01)

(52) U.S. Cl. ................ 726/6; 713/171; 713/182; 726/4; 726/12; 380/286

(58) Field of Classification Search .................. 713/171, 713/182; 726/4–9, 12; 380/286
See application file for complete search history.

(56) References Cited

U.S. PATENT DOCUMENTS

| | | | | |
|---|---|---|---|---|
| 4,438,824 | A * | 3/1984 | Mueller-Schloer | 713/185 |
| 5,481,612 | A * | 1/1996 | Campana et al. | 713/159 |
| 6,442,588 | B1 * | 8/2002 | Clark et al. | 709/203 |
| 6,981,144 | B2 * | 12/2005 | Bauman et al. | 713/168 |
| 6,983,377 | B1 * | 1/2006 | Beesley et al. | 726/12 |
| 7,020,456 | B2 * | 3/2006 | Smeets et al. | 455/411 |
| 7,047,559 | B2 * | 5/2006 | Ohmori | 726/3 |
| 7,133,662 | B2 | 11/2006 | Bravo et al. | |

(Continued)

FOREIGN PATENT DOCUMENTS

JP 03-058507 3/1991

(Continued)

OTHER PUBLICATIONS

Method of One-Way Authentication Via Passphrase, IBM Technical Disclosure Bulletin, vol. 36, Issue 11, Nov. 1, 1993.*

(Continued)

*Primary Examiner* — Eleni Shiferaw
*Assistant Examiner* — Tamara Teslovich
(74) *Attorney, Agent, or Firm* — Orion Consulting, Ltd.; Joseph P. Farrar

(57) ABSTRACT

Verification facilitating company or companies X and verifying company or companies (e.g., credit service company or companies) Y may respectively manage member ID(s) and password(s) of user(s) 1 in mutually separate and mutually secret fashion. User(s) 1 may send member ID(s) to verification facilitating company or companies X from mobile telephone(s) 2, and verification facilitating company or companies X may use originating telephone number(s) and/or member ID(s) to carry out first-stage identity check(s). In the event of positive verification of identity as a result of such identity check(s), verification facilitating company or companies X may issue one-time ID(s) to user(s) 1 and may communicate such one-time ID(s) to verifying company or companies (e.g., credit service company or companies) Y. User(s) 1 may send one-time ID(s) and password(s) to verifying company or companies (e.g., credit service company or companies) Y from company or companies (e.g., store or stores) Z. Verifying company or companies (e.g., credit service company or companies) Y may use one-time ID(s) and password(s) to carry out second-stage identity check(s), and in the event of positive verification of identity as a result of such identity check(s), may provide credit transaction processing or other such service(s).

19 Claims, 32 Drawing Sheets

U.S. PATENT DOCUMENTS

| | | | |
|---|---|---|---|
| 7,177,627 B2 * | 2/2007 | Melaku et al. | 455/414.1 |
| 7,249,110 B1 * | 7/2007 | Kimura et al. | 705/67 |
| 7,308,580 B2 * | 12/2007 | Nelson et al. | 713/183 |
| 7,325,065 B1 * | 1/2008 | Watkins | 709/229 |
| 7,366,905 B2 * | 4/2008 | Paatero | 713/175 |
| 2002/0069173 A1 * | 6/2002 | Hori | 705/51 |
| 2002/0106081 A1 * | 8/2002 | Yang | 380/201 |
| 2002/0147820 A1 * | 10/2002 | Yokote | 709/229 |
| 2003/0200466 A1 * | 10/2003 | Nelson et al. | 713/202 |
| 2003/0221126 A1 * | 11/2003 | Berman et al. | 713/201 |
| 2006/0021016 A1 * | 1/2006 | Birk et al. | 726/10 |
| 2007/0115940 A1 * | 5/2007 | Kamen et al. | 370/352 |
| 2007/0242827 A1 * | 10/2007 | Prafullchandra et al. | 380/241 |

FOREIGN PATENT DOCUMENTS

| | | |
|---|---|---|
| JP | 04329730 | 11/1992 |
| JP | 06152586 | 5/1994 |
| JP | 9-81519 | 3/1997 |
| JP | 10269181 | 10/1998 |
| JP | 11250012 | 9/1999 |
| JP | 2000010927 | 1/2000 |
| JP | 2001045562 | 2/2001 |
| JP | 2001117873 | 4/2001 |
| JP | 2001175599 | 6/2001 |
| JP | 2001184310 | 7/2001 |
| JP | 2001243196 | 9/2001 |
| JP | 2001256411 | 9/2001 |
| JP | 2001266034 | 9/2001 |
| JP | 2001290554 | 10/2001 |
| JP | 2001298779 | 10/2001 |
| JP | 2001312471 | 11/2001 |
| JP | 2001318894 | 11/2001 |
| JP | 2001319186 | 11/2001 |
| JP | 2001331449 | 11/2001 |
| JP | 2001350724 | 12/2001 |
| JP | 2001357015 | 12/2001 |
| JP | 2001357337 | 12/2001 |
| JP | 02007355 | 1/2002 |
| JP | 02024182 | 1/2002 |
| JP | 2002007348 | 1/2002 |
| JP | 2002007355 | 1/2002 |
| JP | 2002007698 | 1/2002 |
| JP | 2002015139 | 1/2002 |
| JP | 2002032342 | 1/2002 |
| JP | 2002032572 | 1/2002 |
| JP | 2002032710 | 1/2002 |
| JP | 02057661 | 2/2002 |
| JP | 02092494 | 3/2002 |
| JP | 2002082910 | 3/2002 |
| JP | 2003-058507 | 2/2003 |
| JP | 2004-501460 | 1/2004 |
| WO | W001/99378 | 12/2001 |
| WO | WO 01/99378 | 12/2001 |

OTHER PUBLICATIONS

Menezes, van Oorschot and Vanstone. Handbook of Applied Cryptography. 1997. CRC Press. pp. 500-504, 545-556, 563-566.*

* cited by examiner

METHOD AND SYSTEM FOR VERIFYING IDENTITY

BACKGROUND

The present invention pertains to a method and system for electronically ascertaining whether a person attempting some action, e.g., someone attempting to process a credit card transaction or to log on to a server, is in fact a person authorized to perform such action.

Systems for verifying personal identity through use of an IC card, smart card, in the possession of such person are known in the art. Furthermore, systems for verifying personal identity through use of an ID (e.g., telephone number) of a mobile telephone in the possession of such person are known in the art. However, such systems, rather than ascertaining the identity of the person in question, substitute ascertainment of the fact of use of such equipment (serving as a tool for such purpose) for verification of personal identity. A third party using such equipment and pretending to be the person in question might easily outwit such a system.

Also known in the art are systems for verifying personal identity whereby a user ID-password set unique to a person is input into the system by the person in question, and authentication is carried out using that user ID-password set. However, by intercepting communication between that person and the system, a third party might gain access to the user ID-password set and might make illicit use of same.

To improve reliability of authentication, systems for verifying personal identity making use of temporary or one-time IDs good for only a single use are known in the art. The systems described at Japanese Patent Application Publication Kokai No. H12-10927 (2000), Japanese Patent Application Publication Kokai No. H13-175599 (2001), Japanese Patent Application Publication Kokai No. H14-7355 (2002) and the like may be cited as examples. However, in all of these systems, for a one-time ID to be issued, a set comprising an ID of a mobile telephone or a user ID and a password must be input into the system, just as was the case with the other conventional systems described above. This being the case, here again a third party might use the mobile telephone and pretend to be the person in question, or might intercept communication to gain access to the user ID-password set, allowing the third party to acquire a one-time ID in the same fashion as the person in question, which might then be used for some illicit purpose by the third party.

Moreover, as more reliable systems for verifying personal identity, arrangements making use of biometric equipment are known and have recently even become something of a fad. However, the fact that expensive biometric equipment must be purchased makes this an unattractive option for use in verifying personal identity for the everyday sorts of actions performed by large numbers of people, such as those involving processing of credit transactions or logging on to a system.

SUMMARY

It is an object of the present invention to provide a mechanism by which personal identity may be verified that is inexpensive and yet reliable.

In a method for verifying identity in accordance with a first aspect of the present invention, only first key of a users possessing both first key and second key is saved by a first systems, and only second key of at least one of the user possessing both first key and second key is saved by a second systems. First key and second key may thus be separately saved by different systems. The different systems may keep their respective keys secret from each other.

At least one of the first system may receive input of data purporting to be at least one of the first key from a parties purporting to be at least one of the user and may carry out a first-stage identity checks by comparing at least one of the input purported first key to at least one of the saved first key of at least one of the user. If at least one positive verification of identity is made at least one of the first-stage identity check, at least one of the first system may cause a one-time IDs to be issued to at least one of the user. At least one of the first system may communicate to at least one of the second system at least one of the one-time ID issued to at least one of the user. At least one of the second system may save at least one of the one-time ID communicated thereto by the at least one first system.

At least one of the second system may receive input of data purporting to be at least one of the second key and at least one of the one-time ID and may carry out a second-stage identity checks by comparing at least one of the input purported second key and at least one of the input purported one-time ID to at least one of the saved second key and at least one of the saved one-time ID of at least one of the user. Provision of a services to at least one of the user may be controlled in correspondence to at least one result of at least one of the second-stage identity check.

In a preferred embodiment, at least one of the first system may, in addition to the first key, also save a identification numbers of a mobile communication terminals of at least one of the user. Furthermore, in such a preferred embodiment, at least one of the first system may receive input of data purporting to be at least one of the first key by way of a mobile communication terminals from at least one of the party purporting to be at least one of the user, and may carry out at least one of the first-stage identity check by comparing at least one of the input purported first key and at least one identification number of at least one of the mobile communication terminal used for input thereof to at least one of the saved first key and at least one of the saved identification number of at least one of the mobile communication terminal of at least one of the user.

In a preferred embodiment, at least one of the first system may further save a facial images of at least one of the user. Furthermore, in such a preferred embodiment, if at least one positive verification of identity is made at least one of the first-stage identity check, at least one of the first system may, in addition to the a one-time IDs, cause at least one of the saved facial image of at least one of the user to be issued to at least one of the user in such fashion as to permit display thereof by at least one of the user.

In a method for verifying identity in accordance with another aspect of the present invention, first key and second key of user may be saved in mutually secret fashion to separate first system and second system as described above. Furthermore, at least one of the first system may receive input of data purporting to be at least one of the first key from a parties purporting to be at least one of the user and may carry out a first-stage identity checks by comparing at least one of the input purported first key to at least one of the saved first key of at least one of the user. If at least one positive verification of identity is made at least one of the first-stage identity check, at least one of the first system may cause a first one-time IDs to be issued to at least one of the user, and may communicate to at least one of the second system at least one of the first one-time ID issued to at least one of the user. At least one of the second system may save at least one of the first one-time ID communicated thereto by the at least one first system.

At least one of the second system may thereafter receive input of data purporting to be at least one of the second key and at least one of the first one-time ID from a parties purporting to be at least one of the user and may carry out a second-stage identity checks by comparing at least one of the input purported second key and at least one of the input purported first one-time ID to at least one of the saved second key and at least one of the saved first one-time ID of at least one of the user. If at least one positive verification of identity is made at least one of the second-stage identity check, at least one of the second system may cause a second one-time IDs to be issued to at least one of the user and may save at least one of the issued second one-time ID.

At least one of the second system may receive input of data purporting to be at least one of the first one-time ID and at least one of the second one-time ID, and may carry out a third-stage identity checks by comparing at least one of the input purported first one-time ID and at least one of the input purported second one-time ID to at least one of the saved first one-time ID and at least one of the saved second one-time ID of at least one of the user. Provision of a services to at least one of the user may be controlled in correspondence to at least one result of at least one of the third-stage identity check.

BRIEF DESCRIPTION OF DRAWINGS

These and other features, aspects, and advantages of the present invention will become better understood with reference to the following description, appended claims, and accompanying drawings where:

DESCRIPTION

Figure 1:
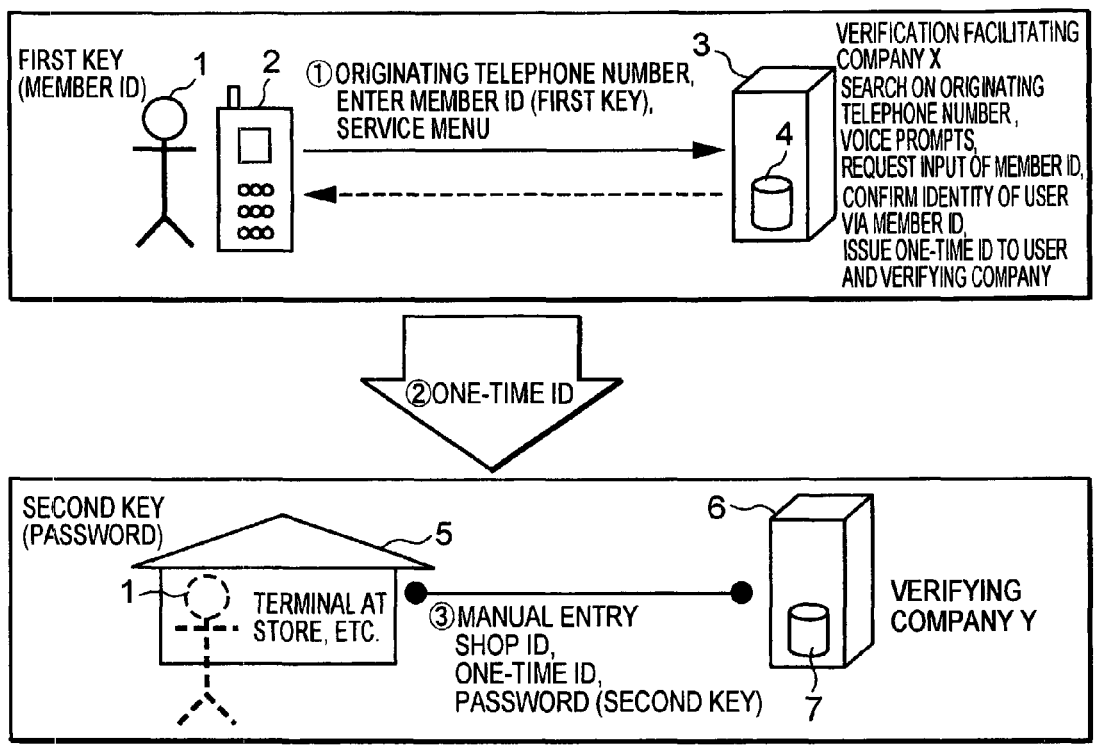
FIG. 1 is a block diagram showing basic constitution and operation in one embodiment of a method for verifying identity in accordance with the present invention.

Below, several exemplary embodiments of the present invention are described in detail with reference to the drawings FIG. 1 shows basic constitution and operation in one embodiment of a method for verifying identity in accordance with the present invention. Note that as used herein, the terms "verification," "identification," "authentication," and the like are used essentially interchangeably, without intention to limit the invention thereby.

Referring to the lower half of FIG. 1, when certain user 1 attempts to use particular service provided by particular organization Y (e.g., when attempting to use credit transaction processing service of particular credit service company, when attempting to log on to server of company operating particular system,), organization Y may carry out identity check to ascertain that user 1 is in fact among a previously registered person entitled to receive that particular service. Organization Y thus having need to verify identity of user 1 will be referred to as "verifying company" in the present specification, the singular being used for the sake of brevity but without intention to exclude the possibility of a plurality thereof. To carry out identity check on user 1 (and optionally to in addition carry out processing in connection with such particular service), verifying company Y may have computer system (hereinafter "verifying system") 6. Such verifying system 6 may be capable of communication with terminal 5, any number of which may be utilized directly or indirectly when user 1 attempts to receive the particular service. For example, if user 1 attempts to purchase goods involving processing of credit transaction by certain store, such terminal 5 might correspond to point-of-sale ("POS") terminal at the store; if user 1 attempts to log on to certain server from personal computer belonging to user 1, such terminal 5 might correspond to that personal computer; and so forth.

Furthermore, referring to the top half of FIG. 1, organization X for facilitating such processing for verification of identity carried out by verifying company Y may be provided separately from verifying company Y. Organization X for facilitating such verification will be referred to as "verification facilitating company" in the present specification, the singular being used for the sake of brevity but without intention to exclude the possibility of a plurality thereof. To carry out processing for facilitating such verification, verification facilitating company X may have computer system (hereinafter "verification facilitating system") 3. Verification facilitating system 3 may moreover be capable of communication with verifying system 6.

User 1 may possess mobile communication terminal 2. In the present embodiment, mobile communication terminal 2 of user 1 may be mobile telephone (but note that mobile telephone are here cited only by way of example, it being possible to alternatively or additionally use other types of mobile communication terminals such as, for example, PDAs, laptop- or notebook-type personal computers, car navigation apparatuses, and so forth). Mobile telephone 2 of user 1 may be capable of communication with verification facilitating system 3.

User 1 may have two keys, i.e., first key and second key, these being unique to such user 1. In the description that follows, whereas such first such key will be referred to as "member ID" and such second key will be referred to as "password," this is merely for the sake of convenience in distinguishing between such keys and is not intended to limit the scope of the invention, the important thing from the standpoint of the invention being not the particular word which is used but the whether the role of the corresponding element in the present invention is served. User 1 preferably keep such "member ID" and "password," these being unique to such user 1, secret from other parties (e.g., by memorizing same and recording same nowhere but in the mind of such user 1).

Member ID may be recorded not only in the mind, for example, of user 1 but also at database 4 belonging to verification facilitating system 3. That is, user 1 and verification facilitating system 3 (verification facilitating company X) may both possess such member ID. In such case, the only party other than user 1 aware of the member ID is verification facilitating system 3 (verification facilitating company X).

Password may be recorded not only in the mind, for example, of user 1 but also at database 7 belonging to verifying system 6. That is, user 1 and verifying system 6 (verifying company Y) may both possess such password. In such case, the only party other than user 1 aware of the password is verifying system 6 (verifying company Y).

Accordingly, verification facilitating system 3 (verification facilitating company X) knows the member ID of such user 1 but do not know the password thereof. Conversely, verifying system 6 (verifying company Y) knows the password but do not know the member ID. In such case, the only party aware of both keys unique to the user 1 is the user 1. Apart from the user 1, only verification facilitating system 3 (verification facilitating company X) and verifying system 6 (verifying company Y), which constitute separate systems (organizations or sets of organizations), respectively or separately keep the member ID and password in mutually isolated fashion. Verification facilitating system 3 (verification facilitating company X) and verifying system 6 (verifying company Y) may respectively manage member ID and password such that they are separate and secret, one system (organization) not revealing its key to the other system (organization).

Such separate, secret, and isolated management of the two types of keys belonging to the user 1 permits improved reliability, which is to say security, in the verification of identity of user 1, as described in further detail below. Furthermore, to link these two types of keys, managed as has been described so as to be mutually isolated, a third type of key may be employed. Such third key, being temporary, session, or single-use key, may be referred to as "one-time ID" in the present specification, and such one-time key may be issued by verification facilitating system 3 on demand by user 1.

Note that while FIG. 1 only shows a single verifying company Y, there may in general be a plurality of such companies, and as noted elsewhere the singular is employed herein without intention to preclude presence of a plurality of same. Furthermore, regardless of whether there are a plurality of such verifying companies Y, there may be a plurality of verification facilitating companies X or there may be only a single verification facilitating company X (while there may of course be a plurality of such verification facilitating companies X, for convenience of description the present specification treats the case of verification of identity as facilitated by a single verification facilitating company X).

An exemplary sequence of operations for verifying identity using member ID, password, and one-time ID is described below. In the present example, this sequence of operations can be divided into roughly two parts.

In the first part, shown in the top half of FIG. 1, preliminary first-stage identity check of party purporting to be user 1 may be carried out by verification facilitating system 3 using member ID, and in the present example, identification number of mobile telephone belonging to user 1 (whereas telephone number of mobile telephone are used in the present example, other types of identifying code associated with such mobile telephone may alternatively or additionally be employed). In the event of positive verification of identity as a result of such preliminary identity check, verification facilitating system 3 may issue one-time ID. Such one-time ID may be communicated to both user 1 and verifying system 6.

That is, in this first part of the present exemplary sequence of operations, user 1 might use mobile telephone 2 belonging to such user 1 to place call to verification facilitating system 3. Such verification facilitating system 3 might automatically answer such call and might compare telephone number of originating party (the telephone number of the mobile telephone 2) to a list of telephone number of member (party authorized to use the system in question) registered in database 4. If as a result of such comparison it is determined that telephone number of originating party matches telephone number of registered member, verification facilitating system 3 might send to mobile telephone 2 of user 1 service menu (e.g., in the form of voice prompts) prepared for user 1. User 1 might use numeric keypad (or voice recognition functionality) of mobile telephone 2 to select desired service offered by desired verifying company Y (e.g., credit transaction processing service offered by credit service company) and to enter member ID of such user 1 as prompted by such service menu, upon which such member ID might be sent to verification facilitating system 3. Such verification facilitating system 3 might compare such received member ID with member ID for member registered in database 4 found as described above as a result of match with originating telephone number, and might determine, at least for the present purposes, that user 1 is in fact the member they purport to be if received member ID matches the corresponding member ID recorded in database 4 for the party having the originating telephone number. Upon making such determination, verification facilitating system 3 might issue one-time ID and might communicate such one-time ID to mobile telephone 2 of user 1, and might moreover communicate such one-time ID to verifying system 6 of desired verifying company Y selected by user 1 from service menu. The one-time ID referred to here is unique data capable of being distinguished from other one-time ID handled or likely to be handled by verification facilitating system 3 and verifying system 6.

Furthermore, included among the data present for each member registered in database 4 of verification facilitating system 3 there may be, in addition to the aforementioned member ID and telephone number of mobile telephone, unique ID (hereinafter "management master ID") assigned to that member so as to permit identification of that member by verifying system 6, in which case verification facilitating system 3 may, when communicating to verifying system 6 the one-time ID issued to user 1, also together therewith communicate to verifying system 6 the management master ID of the user 1 (i.e., management master ID of member matched to originating telephone number at the foregoing first-stage identity check). This will permit verifying system 6 to determine which member was issued the one-time ID communicated thereto. Verifying system 6 may save one-time ID communicated thereto in database 7 as one-time ID for the member to which it was issued. For each respective member capable of using verifying system 6, then, management master ID and password may be registered in advance at database 7 of verifying system 6, and one-time ID may furthermore be registered therein as it is issued, as described above.

In this second part of the present exemplary sequence of operations, shown in the bottom half of FIG. 1, second-stage identity check of party purporting to be user 1 may in the present example be carried out by verifying system 6 using one-time ID issued to user 1 and password unique to user 1.

That is, in the second part of the present exemplary sequence of operations, in order to receive the aforementioned desired service, user 1 might use suitable terminal 5 to send one-time ID and password of user 1 from such terminal 5 to verifying system 6 of verifying company Y. What is here referred to as suitable terminal 5 might, for example if user 1 attempts to use credit transaction processing service to purchase goods at certain store, correspond to POS terminal present at the store; or if user 1 attempts to log on to certain server from personal computer belonging to user 1, correspond to such personal computer. Moreover, the person directly operating such terminal 5 need not be the user 1; other person, such as employee at store, may alternatively or additionally perform such operations. Note that at time when one-time ID and/or password of user 1 is sent to verifying system 6, supplemental information to further improve processing to verify identity or as required to carry out processing in connection with service to be provided subsequent to processing to verify identity, such as for example store ID of the aforementioned store, might also typically be sent to verifying system 6 together therewith.

Upon receipt of one-time ID and password of user 1, verifying system 6 might search through sets of one-time ID and password for various member already stored in database 7 to see if there is set which match received one-time ID and password. If as a result of such search, set of one-time ID and password of certain member matches received one-time ID and password, verifying system 6 might determine, at least for the present purposes, that user 1 is in fact the member they purport to be, in which case the result of such search would be that positive identification has been made. In the event that positive identification has thus been made, the aforementioned desired service might then be provided to user 1 (e.g., processing of credit transaction might be carried out, permission might be granted to log on to server, etc.).

If on the other hand it is found as a result of the foregoing procedure that no set of one-time ID and password for member within database 7 matches received one-time ID and password, the result of such search might be that positive identification has not been made, in which case the aforementioned desired service might not be provided to user 1.

Addressing again the situation where positive identification has been made, in such a case verifying system 6 might assign a "used" status to one-time ID within database 7 which was used in making such positive identification, and might moreover report to verification facilitating system 3 that such one-time ID has been used. Processing may be such that "used" one-time ID is not able to be used again for verification of identity (e.g., until passage of a sufficiently long period of time as described below). Addressing again the situation where positive identification has not been made, processing may in such a case be such that verifying system 6 would not in general assign a "used" status to any one-time ID within database 7. Furthermore, processing may be such that one-time ID expires if not used by certain time, in which case verifying system 6 might assign an "expired" status to such one-time ID within database 7 upon passage of such time regardless of whether it has not been used in making any positive identification, and might moreover report to verification facilitating system 3 that such one-time ID is expired. Processing may be such that "used" one-time ID and/or "expired" one-time ID does not become available to be issued again for use in verification of identity until passage of a sufficiently long period of time (i.e., such one-time ID might again be made available for issuing only after sufficient time has passed—e.g., 1 year, 3 years,—to substantially eliminate the likelihood of any compromise in security or reliability due to proximity in time to the previous issuance of such one-time ID). In such case, the only one-time ID which would in general be available for use in verification of identity would therefore be one-time ID that is neither "used" nor "expired." "Used" one-time ID and/or "expired" one-time ID may however be subsequently used to assist in detection of fraudulent or accidental attempts at repeated use of one-time ID.

Figure 2:
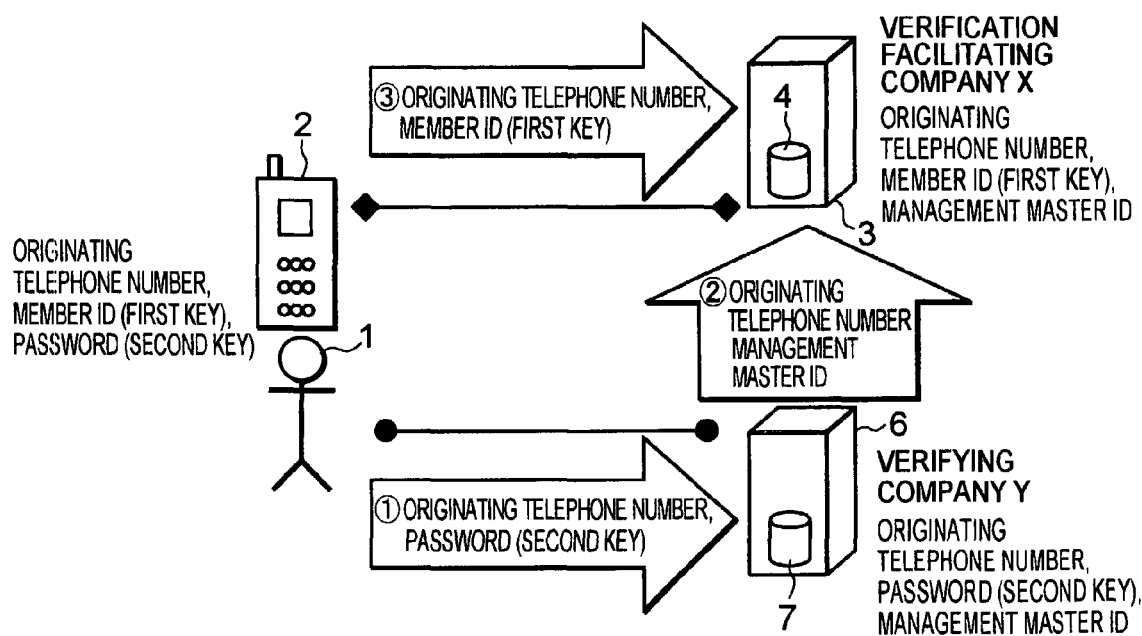
FIG. 2 is a block diagram showing a method for registering keys and so forth which may be employed in this embodiment.

FIG. 2 shows an example of a procedure by which user 1 might register his, her, its, and/or their key with verification facilitating system and/or verifying system.

Referring to FIG. 2, as indicated at step ①, user 1 might use mobile telephone 2 belonging to such user 1 to place call to verifying system 6 of desired verifying company Y (or might communicate therewith via other suitable method such as written correspondence, WWW service,), requesting registration as member. When making such request, in addition to street address(es), name, birth date, and/or other item ordinarily provided on application for membership to permit access to desired service, user 1 might also communicate originating telephone number (e.g., telephone number of mobile telephone 2) and password of such user 1 to verifying system 6 (note that where communication to verifying system 6 is via mobile telephone 2, the originating telephone number thereof might ordinarily be communicated thereto automatically). If the information supplied on the application by user 1 is sufficient to satisfy condition for membership, verifying system 6, in registering user 1 as member thereof, might assign unique management master ID to user 1 and might record such management master ID, such originating telephone number and password, and any such foregoing item ordinarily provided on application for membership, in database 7 as member data unique to such user 1.

At step ②, verifying system 6 might communicate such management master ID and originating telephone number, and only such minimal information—e.g., names—present among any such foregoing item ordinarily provided on application for membership as is necessary for facilitating verification (other personal information, e.g., street address(es), contact information, and the like, being omitted in the interest of preserving confidentiality of personal information) registered for such user 1 to verification facilitating system 3 of verification facilitating company X. In such case, password of user 1 is kept secret by verifying system 6, not being communicated to verification facilitating system 3.

At step ③, user 1 might use mobile telephone 2 belonging to such user 1 to place call to verification facilitating system 3 (or might answer call placed by verification facilitating system 3 to mobile telephone 2 belonging to such user 1) to confirm selection of such verifying company Y and any such foregoing item ordinarily provided on application for membership, and might moreover communicate originating telephone number (telephone number of mobile telephone 2) and member ID of such user 1 to verification facilitating system 3 by way of such mobile telephone 2 (note that where user 1 places call to verification facilitating system 3 from mobile telephone 2, the originating telephone number thereof might ordinarily be communicated to such verification facilitating system 3 automatically; and where verification facilitating system 3 places call to mobile telephone 2, confirmation of the fact that the answering party is user 1 might per force be taken as confirmation of such originating telephone number). As a result of such telephonic or like communication with such user 1, verification facilitating system 3 may be able to confirm correctness of originating telephone number and any such foregoing item ordinarily provided on application for membership, and may consequently, in registering user 1 as member thereof, record in database 4 as member data unique to such user 1 such originating telephone number, management master ID, and any such foregoing item ordinarily provided on application for membership of such user 1. In such case, member ID of user 1 is kept secret by verification facilitating system 3, not being communicated to verifying system 6.

Examples of application of this embodiment to a number of specific uses are described below.

Figure 3:
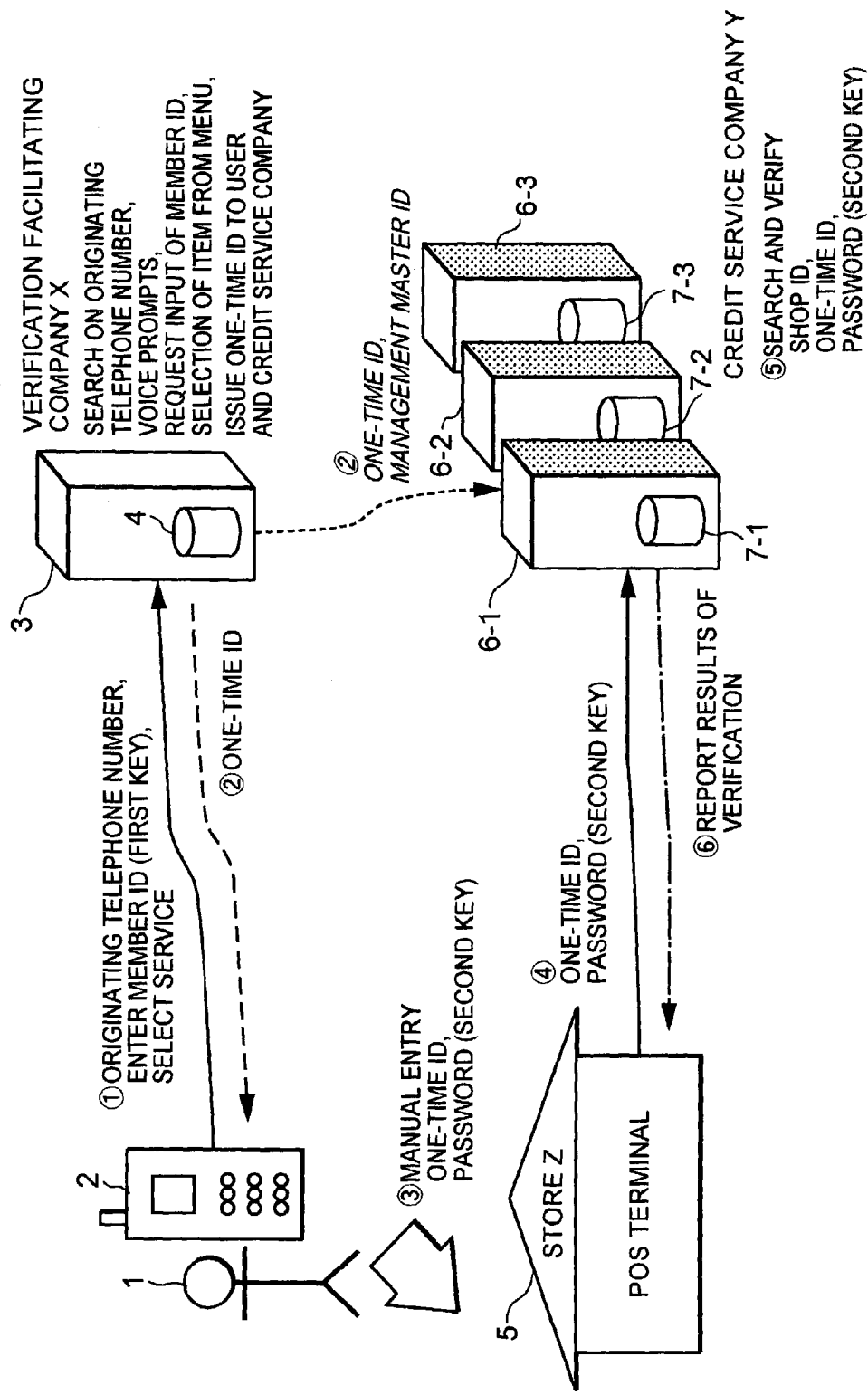
FIG. 3 is a block diagram showing an application in the context of verification of identity such as might be carried out during processing of credit transaction.

As a first example of application of the present embodiment, FIG. 3 shows an application in the context of verification of identity such as might be carried out during processing of credit transaction.

In such case, as shown in FIG. 3, verifying company Y might correspond to credit service company used by user 1, and verifying system 6 might correspond to computer system belonging to such credit service company.

Referring to FIG. 3, at time when user 1 wishes to pay for purchase of goods at store Z by means of credit transaction, user 1 might, at step ①, place call to verification facilitating system 3 from mobile telephone 2 belonging to such user 1. Upon so doing, verification facilitating system 3 might recognize which member is placing call based on originating telephone number of mobile telephone 2, and might return to such mobile telephone 2 service menu (e.g., voice prompts) designed for such member. User 1 might operate mobile telephone 2 as prompted by such service menu, communicating member ID of such user 1 and selected service (e.g., selection of credit transaction processing service by desired credit service company Y) to verification facilitating system 3. Such verification facilitating system 3 might compare member ID communicated thereto from such purported user 1 with member ID of any member recognized based on originating telephone number, and might determine, at least for the present purposes, that user 1 is in fact the member they purport to be in the event that such member IDs respectively match. Upon making such determination, verification facilitating system 3 might, at step ②, issue to such user 1 unique one-time ID and might send same to mobile telephone 2 of user 1 and to verifying system of credit service company Y selected by user 1 (in the example shown in the drawing, such verifying system corresponds to system 6-1, this being a system associated with the company selected by the user 1, and one of three systems 6-1 through 6-3 associated with three companies that all use the same verification facilitating company X). At such time, verification facilitating system 3 might, together with such one-time ID, also send verifying system 6-1 management master ID assigned to such member by such verifying system 6-1. Verifying system 6-1 might save such received one-time ID in database 7-1 as one-time ID for the member corresponding to the received management master ID.

User 1, after receiving such issued one-time ID at mobile telephone 2 belonging to user 1, might, at step ③, enter one-time ID and password of such user 1—e.g., by manual input thereof—at POS terminal 5 for processing of credit transaction at store Z. At step ④, such input one-time ID and password might be sent from POS terminal 5 to verifying system 6-1 of verifying company Y designated by user 1.

Upon receipt of such one-time ID and password, verifying system 6-1 might, at step ⑤, compare such received set of one-time ID and password with set of one-time ID and password for various member present within database 7-1. If as a result of such comparison, set of one-time ID and password of certain member matches received one-time ID and password, verifying system 6-1 might determine, at least for the present purposes, that user 1 is in fact the member they purport to be (positive identification made). If on the other hand no member has a matching one-time ID and password set, verifying system 6-1 might determine, at least for the present purposes, that user 1 is not the member they purport to be (positive identification not made). Where positive identification has been made, verifying system 6-1 might use credit card information for user 1 sent thereto from POS terminal 5 to carry out credit transaction service processing. Where positive identification has not been made, verifying system 6-1 might deny access to credit transaction processing service.

At step ⑥, verifying system 6-1 might return to POS terminal 5 the results of the foregoing identity check (and/or results of any subsequent processing of credit transaction processing service). At the foregoing second-stage identity check, verifying system 6-1 might assign a "used" status to one-time ID of user 1 which was used here, preventing same from being used again for verification of identity before expiration of some sufficiently long time as described above.

Figure 4:
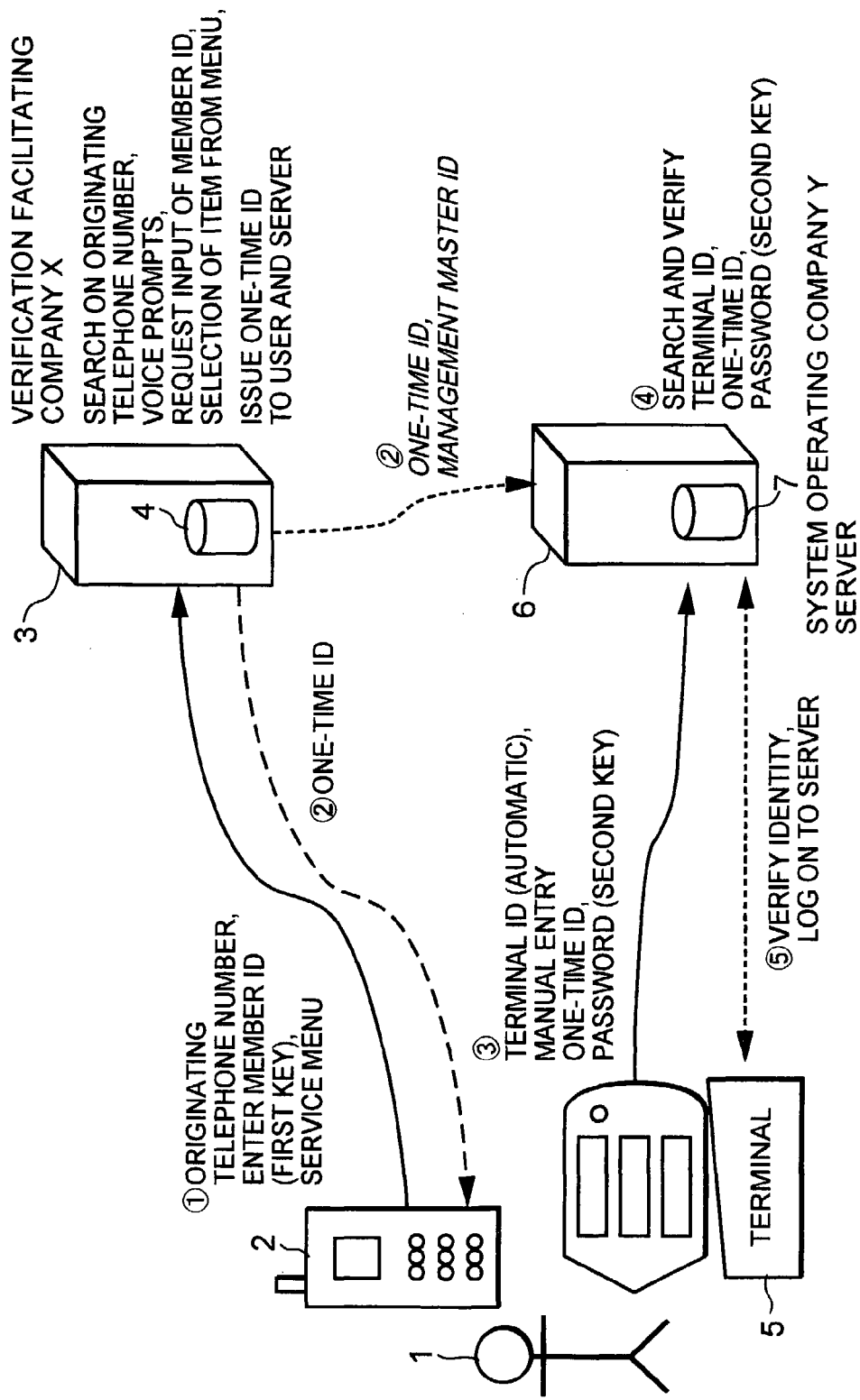
FIG. 4 is a block diagram showing an application in the context of verification of identity such as might be carried out when logging on to server.

As a second example of application of the present embodiment, FIG. 4 shows an application in the context of verification of identity such as might be carried out when logging on to certain server.

In such case, as shown in FIG. 4, verifying company Y might correspond to system operating company operating server used by user 1, and verifying system 6 might correspond to such server.

At steps ① through ② in FIG. 4, operations through issuance of one-time ID might be similar in principle to operations already described with reference to FIG. 3, the differences being that the service selected for use by user 1 from service menu is logging on to desired server 6, and the one-time ID are sent to such server 6.

After issuance of one-time ID, user 1, at step ③, might enter such one-time ID and password of such user 1—e.g., by manual input thereof—at terminal 5 for logging on to desired server 6 (e.g., personal computer belonging to user 1). Such entered one-time ID and password might be sent to server 6.

At steps ④ through ⑤, processing in connection with identity check carried out at server 6 using one-time ID and password might be similar in principle to processing in connection with identity check already described with reference to steps ⑤ through ⑥ in FIG. 3, the difference being that permission to log on to server 6 is granted instead of credit transaction processing being performed if positive identification is made as a result of the identity check.

Figure 5:
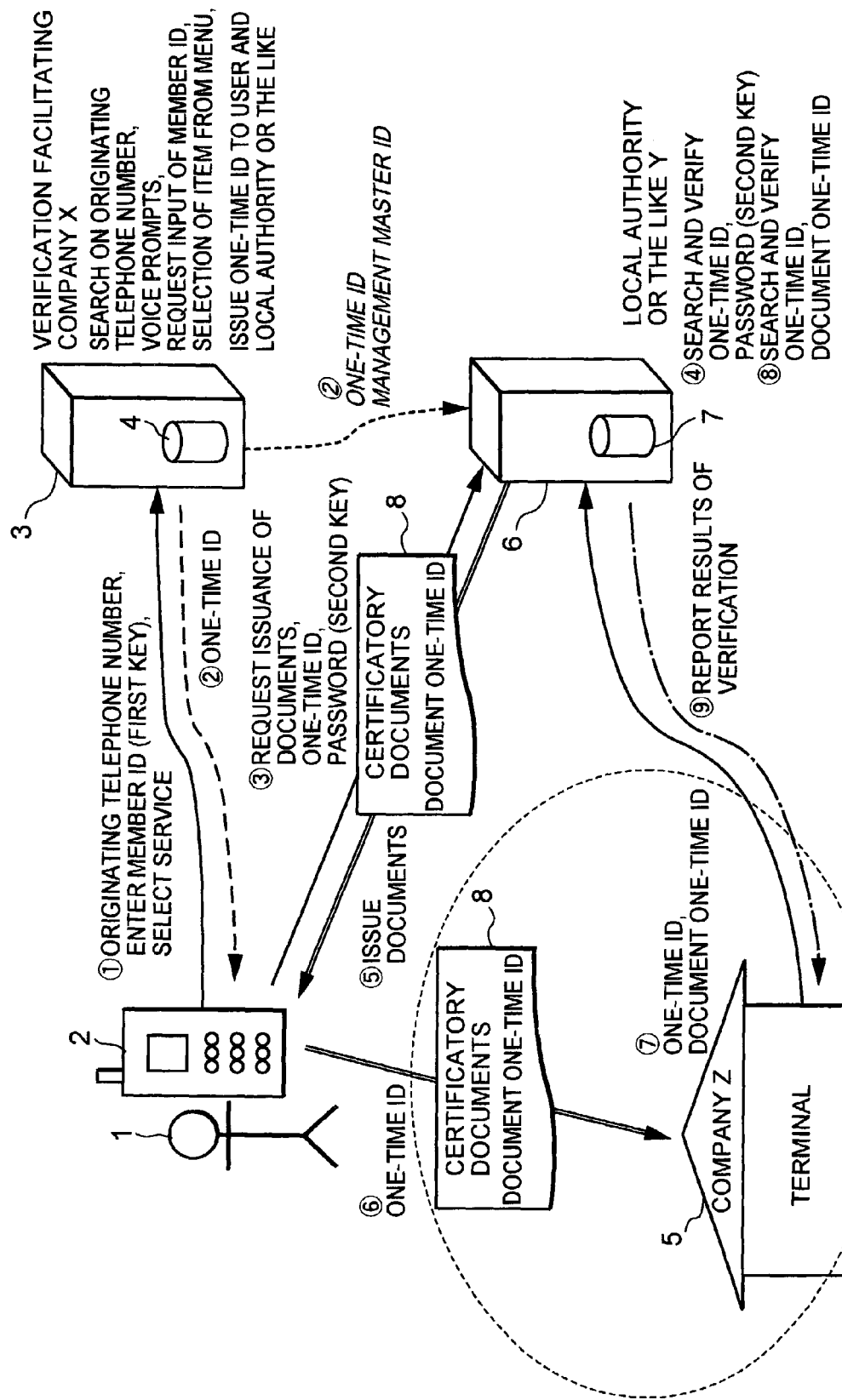
FIG. 5 is a block diagram showing an application in the context of verification of identity such as might be carried out when certificatory document issued by a local authority is to be presented to user 1.

As a third example of application of the present embodiment, FIG. 5 shows an application in the context of verification of identity such as might be carried out when certificatory document issued by a local authority is presented to user 1.

In such case, as shown in FIG. 5, verifying company Y might correspond to such local authority presenting such certificatory document to user 1, and verifying system 6 might correspond to document issuing system associated with such local authority. Furthermore, in the present example, special measures have been adopted that make it possible for the transaction to be completed without the need for user 1 to disclose his, her, its, and/or their member ID and/or password to the other party involved in the transaction when such certificatory document is presented.

At steps ① through ② in FIG. 5, operations through issuance of one-time ID might be similar in principle to operations already described with reference to FIG. 3, the differences being that the service selected for use by user 1 from service menu is the desired document issuing service offered by the local authority, and the one-time ID are sent to document issuing system (verifying system 6) associated with such local authority Y selected by user 1.

After issuance of one-time ID, user 1, at step ③, might cause one-time ID and password of such user 1 to be input to document issuing system (verifying system 6) associated with such local authority Y and might request issuance of desired document therefrom.

At step ④, document issuing system might use one-time ID and password received from user 1 to carry out identity check on user 1, in which case processing in connection with such identity check might be similar in principle to processing in connection with identity check performed by verifying system of credit service company at step ⑤ in FIG. 3.

At step ⑤, if positive identification is made as a result of such identity check, document issuing system 6 might print out the requested certificatory document. At such time, document issuing system 6 might issue document one-time ID and might print out such document one-time ID on such certificatory document. Such document one-time ID might be unique to such certificatory document, permitting it or them to be distinguished from all other document one-time ID, and might furthermore be temporary or capable of only being used once. Such certificatory document with attached document one-time ID might after being printed out be delivered to user 1. Document issuing system 6 might store such issued document one-time ID in database 7 as document one-time ID of user 1. Furthermore, at time when document one-time ID is issued, document issuing system 6 might assign a "document one-time ID issued" status to one-time ID of user 1 but might not yet assign a "used" status thereto. Processing may be such that one-time ID which has been assigned a "document one-time ID issued" status would be prevented from being used again for identity check in connection with document issuance at step ④, but would be capable of being used just once more, in third-stage identity check at step ⑧, below, so long as it had not yet acquired a "used" status.

At step ⑥, user 1 might present such certificatory document to suitable company Z making use of same (e.g., where such certificatory document is being presented in order to conclude certain agreement with company, such company serving as other party to such agreement might correspond to company Z). At time when such document is presented, user 1 might, at step ⑦, use terminal 5 of company Z to send one-time ID of such user 1 and document one-time ID printed on such certificatory document to document issuing system 6 of local authority Y.

Upon so doing, document issuing system 6 might, at step ⑧, compare set of one-time ID and document one-time ID for user 1 received from terminal 5 with set of one-time ID and document one-time ID for various member within database 7. If as a result of such comparison, set of one-time ID and document one-time ID of certain member matches received one-time ID and document one-time ID, document issuing system 6 might determine that positive identification has been made; or if there is no such match, might determine that positive identification has not been made. Furthermore, where positive identification has been made, document issuing system 6 might assign a "used" status to set of one-time ID and document one-time ID of user 1 used therefor, preventing such set from being used again for verification of identity.

In addition, at step ⑨, document issuing system 6 might return to terminal 5 of company Z the results of the foregoing identity check. In the event that returned result of identity check indicate that positive identification has been made, because this means that local authority Y has confirmed that user 1 is in fact the person they purport to be, and moreover, that the certificatory document was in fact issued to such person, company Z can accept the certificatory document from user 1 with confidence.

Furthermore, from the standpoint of user 1, the fact that his, her, its, and/or their secret member ID and password have not been divulged to company Z is beneficial for security.

Figure 6:
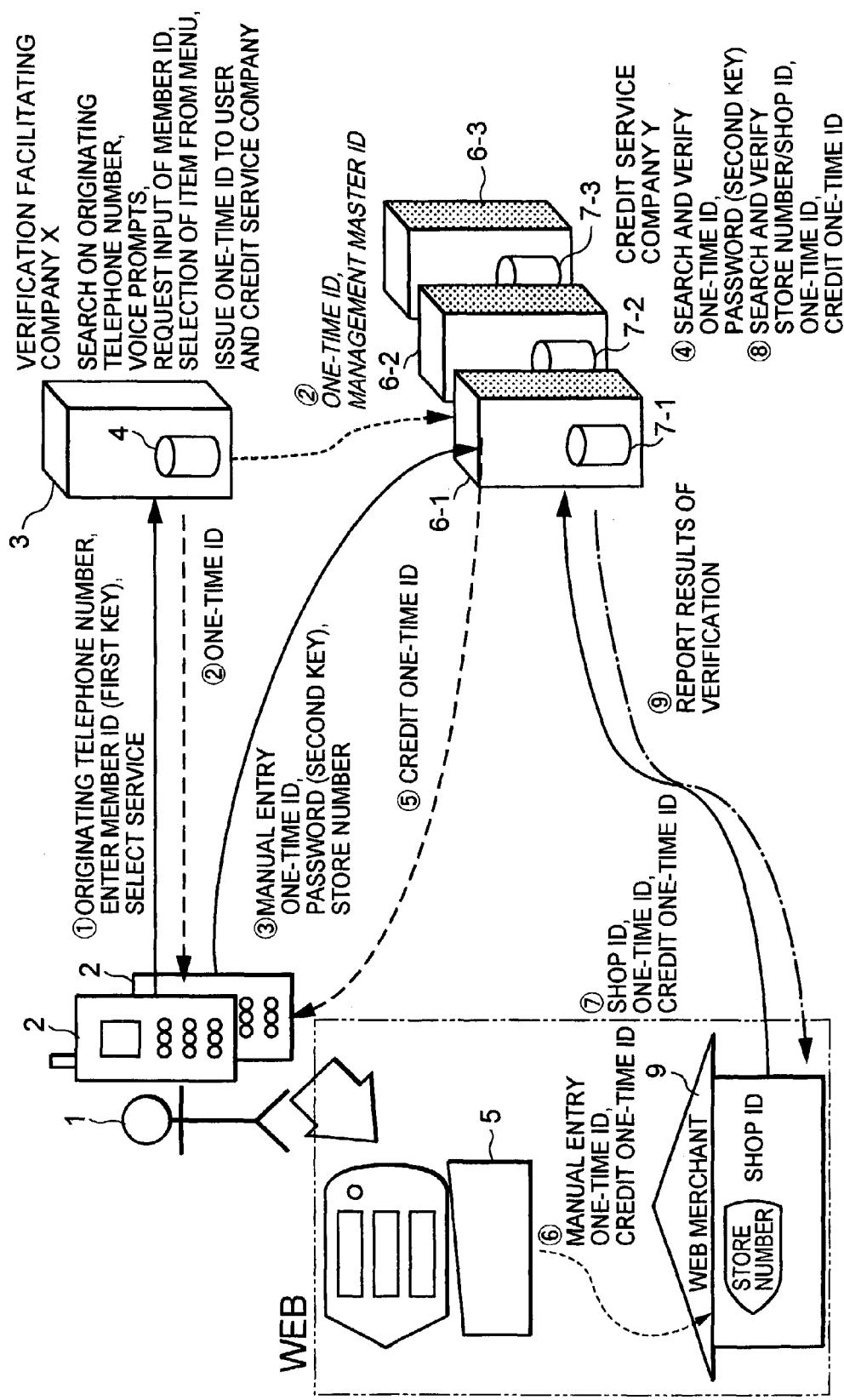
FIG. 6 is a block diagram showing an application in the context of verification of identity such as might be carried out during processing of credit transaction when making purchase over the Internet from web merchant.

As a fourth example of application of the present embodiment, FIG. 6 shows an application in the context of verification of identity such as might be carried out during processing of credit transaction when making purchase over the Internet from web merchant (website).

In such case, as shown in FIG. 6, verifying company Y might correspond to credit service company used by user 1, and verifying system 6 might correspond to verifying system belonging to such credit service company. Furthermore, in the present example, special measures have been adopted that make it possible for the transaction to be completed without the need for user 1 to disclose his, her, its, and/or their credit card information to web merchant.

At steps ① through ② in FIG. 6, operations through issuance of one-time ID are similar in principle to operations already described with reference to FIG. 3.

After issuance of one-time ID, user 1, at step ③, might use mobile telephone 2 belonging to such user 1 to place call to verifying system 6-1 of credit service company Y selected by such user 1, and might send to such verifying system 6-1 one-time ID and password of such user 1 as well as store number (shop ID) of web merchant 9 which such user 1 desire to use.

At step ④, verifying system 6-1 might use one-time ID and password received from user 1 to carry out identity check on user 1 in accordance with a procedure similar to that described with reference to step ⑤ in FIG. 3. If positive identification is made as a result of such identity check, verifying system 6-1 might, at step ⑤, issue credit one-time ID and might send such credit one-time ID to mobile telephone 2 of user 1. Such credit one-time ID might be unique to a particular credit card used by such user 1, permitting it or them to be distinguished from all other credit one-time ID, and might furthermore be temporary or capable of only being used once. Verifying system 6-1 might store such issued credit one-time ID and such store number (shop ID) received from such user 1 in database 7-1 as credit one-time ID and store number (shop ID) corresponding to such user 1. Furthermore, at time when credit one-time ID is issued, verifying system 6-1 might assign a "credit one-time ID issued" status to one-time ID of user 1 but might not yet assign a "used" status thereto. Processing may be such that one-time ID which has been assigned a "credit one-time ID issued" status would be prevented from being used again for identity check in connection with credit one-time ID issuance at step ④, but would be capable of being used just once more, in third-stage identity check at step ⑧, below, so long as it had not yet acquired a "used" status.

At step ⑥, user 1 might use suitable terminal 5 capable of connecting to the Internet (e.g., personal computer belonging to user 1) to connect to web merchant 9 (fresh connection to web merchant 9 would of course not need to be established if connection thereto was made at previous time and has not been broken), and might send one-time ID and credit one-time ID of such user 1—e.g., by manual input thereof—from such terminal 5 to such web merchant 9. At step ⑦, web merchant 9 might send such one-time ID and credit one-time ID from user 1 as well as its or their own store number (shop ID) to verifying system 6-1.

At step ⑧, verifying system 6-1 might compare set of one-time ID and credit one-time ID and store number (shop ID) for such user 1 received from web merchant 9 with set of one-time ID and credit one-time ID and store number (shop ID) for various member within database 7-1. If as a result of such comparison, set of one-time ID and credit one-time ID and store number (shop ID) of certain member matches received one-time ID and credit one-time ID and store number (shop ID), verifying system 6-1 might determine that positive identification has been made; or if there is no such match, might determine that positive identification has not been made. Where positive identification has been made, verifying system 6-1 might use credit card information for user 1 (i.e., member found as a result of match(es) at the foregoing comparison) previously registered in database 7-1 to carry out credit transaction service processing. Where positive identification has not been made, verifying system 6-1 might deny access to credit transaction processing service. Furthermore, where such positive identification has been made, verifying system 6-1 might assign a "used" status to set of one-time ID and creditone-time ID of user 1 used therefor, preventing such set from being used again for verification of identity.

At step ⑨, verifying system 6-1 might return to web merchant 9 the results of the foregoing identity check (and/or results of processing of credit transaction processing service).

In the present application of the present embodiment, because user 1 need not send his, her, its, and/or their secret member ID and password and credit card information out over the Internet, such information not even being divulged to web merchant 9, web shopping can be carried out with confidence.

Figure 7:
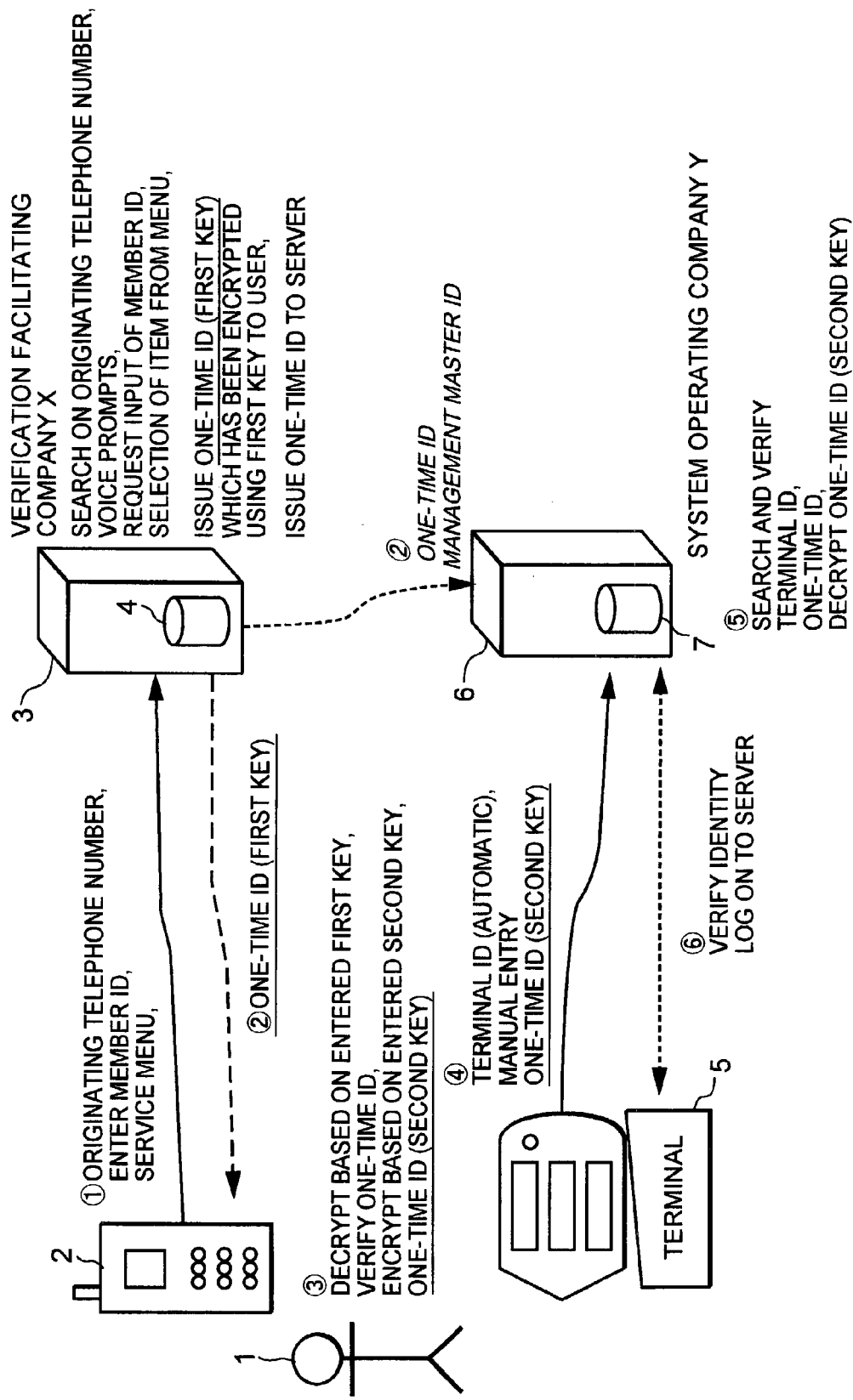
FIG. 7 is a block diagram showing a variation in which encryption processing is added to the application in the context of logging on to server shown in FIG. 4.

As a fifth example of application of the present embodiment, FIG. 7 shows a variation in which encryption processing is added to the application in the context of logging on to server shown in FIG. 4. At FIG. 7, underlining is used to indicate encrypted data.

Description of the variation shown in FIG. 7 will focus primarily on those aspects which differ from the exemplary application shown in FIG. 4.

Mobile telephone 2 of user 1 may possess encryption and/or decryption capability. At step ②, verification facilitating system 3 might use member ID (first key) from user 1 to encrypt one-time ID before sending same to mobile telephone 2 of user 1. Upon receiving such encrypted one-time ID at mobile telephone 2, user 1 might enter his, her, its, and/or their member ID (first key) at mobile telephone 2, using such member ID to decrypt such one-time ID by means of decryption capability present at mobile telephone 2. At step ③, user 1 might enter his, her, its, and/or their password (second key) at mobile telephone 2, using such password (second key) to encrypt such one-time ID by means of encryption capability present at mobile telephone 2.

At step ④, user 1 might enter such encrypted one-time ID at terminal 5—e.g., by manual input thereof—and might send same to server 6. At step ⑤, server 6 might use respective password of various member within database 7 to decrypt such encrypted one-time ID received from user 1, and might then compare such respective decrypted one-time ID to one-time ID of member corresponding to such respective password. If as a result of such comparison, one-time ID of certain member matches received one-time ID, server 6 might determine that positive identification has been made, in which case permission to log on might be granted; or if no one-time ID of any member matches received one-time ID, might determine that positive identification has not been made, in which case permission to log on might not be granted.

By thus respectively using member ID and password at respective stages during processing for verification of identity, and by encrypting and decrypting one-time ID, improved security is achieved with respect to theft of one-time ID through electronic interception thereof. Note that from the standpoint of security it is preferred that entry of member ID, password, and one-time ID by user 1 be done manually (i.e., it is preferred that user 1 memorize same and manually enter each into the system where required).

Such variation in which encryption and decryption processing is added as described with reference to FIG. 7 may be applied not only to the exemplary application shown in FIG. 4, but also to the exemplary applications shown in FIGS. 3, 5, and 6.

Figure 8:
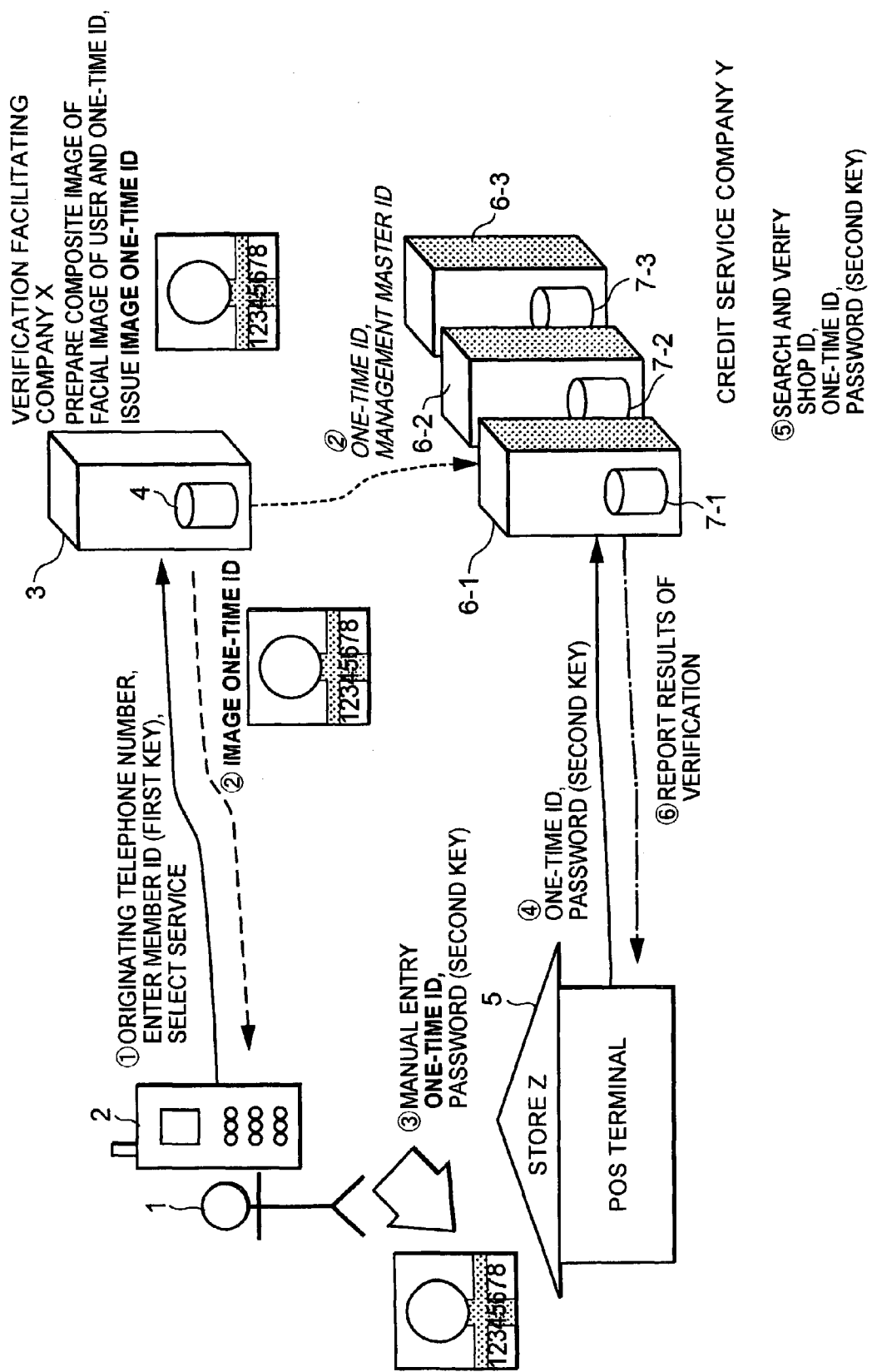
FIG. 8 is a block diagram showing a variation in which facial composite processing is added to the application in the context of credit transaction processing shown in FIG. 3.

As a sixth example of application of the present embodiment, FIG. 8 shows a variation in which facial composite processing is added to the application in the context of credit transaction processing shown in FIG. 3.

Description of the variation shown in FIG. 8 will focus primarily on those aspects which differ from the exemplary application shown in FIG. 3.

Facial image data for each member might be previously stored within database 4 of verification facilitating system 3. At step ②, verification facilitating system 3 might issue image one-time ID, such image one-time ID being composite image data wherein one-time ID is combined with facial image data for user 1 composite image data wherein one-time ID in the form of image of character string is superposed on facial image of user 1 as shown in the drawing, or composite image data wherein one-time ID is embedded through digital watermarking or some other method so as to be invisible to the naked eye on facial image), and such image one-time ID might be sent to mobile telephone 2 of user 1 and verifying system 6-1 of user-selected credit service company Y. Mobile telephone 2 might be capable of displaying received image one-time ID at display panel, permitting user 1 to confirm his, her, its, and/or their facial image by looking at same. Note that mobile telephone 2 may be constituted so as to be capable of extracting and separating facial image and one-time ID of user 1 from image one-time ID and so as to be capable of separate display of facial image and one-time ID at such display.

At step ③, user 1 might cause image one-time ID (or alternatively only facial image portion thereof) to be displayed at display panel of mobile telephone 2 and might show same to store staffperson, and/or might enter one-time ID and password of such user 1—e.g., by manual input thereof—at POS terminal 5 of such store and might send such one-time ID and password to verifying system 6-1 of credit service company Y. Subsequent operations in connection with verification of identity by verifying system 6-1 are similar to those described with reference to the exemplary application shown in FIG. 3.

In the present variation, the fact that facial image of user 1 issued by verification facilitating company X may also be used for verification of identity permits attainment of improved reliability. Because combination of facial image and one-time ID may be carried out by verification facilitating company X each time one-time ID is issued, likelihood of forgery thereof can be reduced.

Such use of facial image is possible not only in the exemplary application shown in FIG. 3, but also in the exemplary applications shown in FIGS. 4 through 6. Furthermore, such use of facial image may be employed in combination with encryption and decryption such as has been described with reference to FIG. 7.

Below, a number of examples are cited to demonstrate how the present embodiment may improve reliability.

Figure 9:
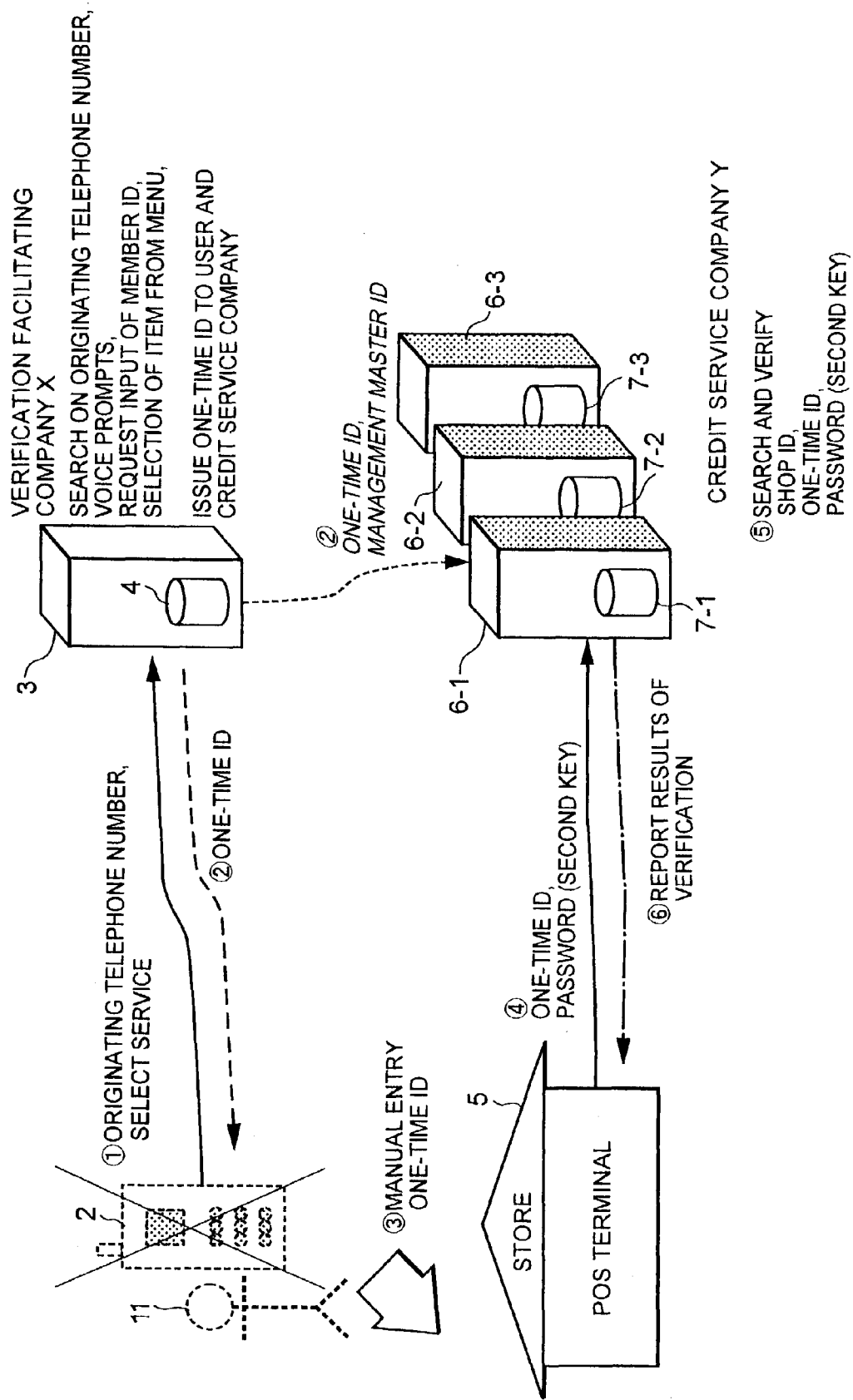
FIG. 9 is a block diagram showing a situation where a third party acquires a mobile telephone belonging to a user and uses same to pretend to be that user.

FIG. 9 shows a situation where a third party acquires a mobile telephone belonging to a user and uses same to pretend to be that user.

Referring to FIG. 9, such third party 11 might find, for example, misplaced mobile telephone 2 and use same to, at step ①, connect to verification facilitating system 3. At such time, because third party 11 cannot enter member ID of the owner of mobile telephone 2, positive identification is not made at first-stage identity check performed by verification facilitating system 3, making it impossible for one-time ID to be issued. Moreover, even if third party 11 somehow happens to come into possession of such member ID and somehow manages get one-time ID issued, because third party 11 is unable to enter password of the owner of mobile telephone 2 at step ③, positive identification is not made at second-stage identity check performed by verifying system 6-1.

Accordingly, in such situation where a third party 11 pretends to be a user, so long as the third party 11 does not know both the member ID and password of the user, such third party 11 will be unable to obtain positive identification during identity check. Since member ID and password are respectively managed in isolated fashion by verification facilitating company X and credit service company (verifying company) Y, unlike the conventional situation where a single organization might manage sets of member ID and password, it is extremely difficult for a third party to come into possession thereof. As a result, high reliability in verification of identity is therefore permitted.

Figure 10:
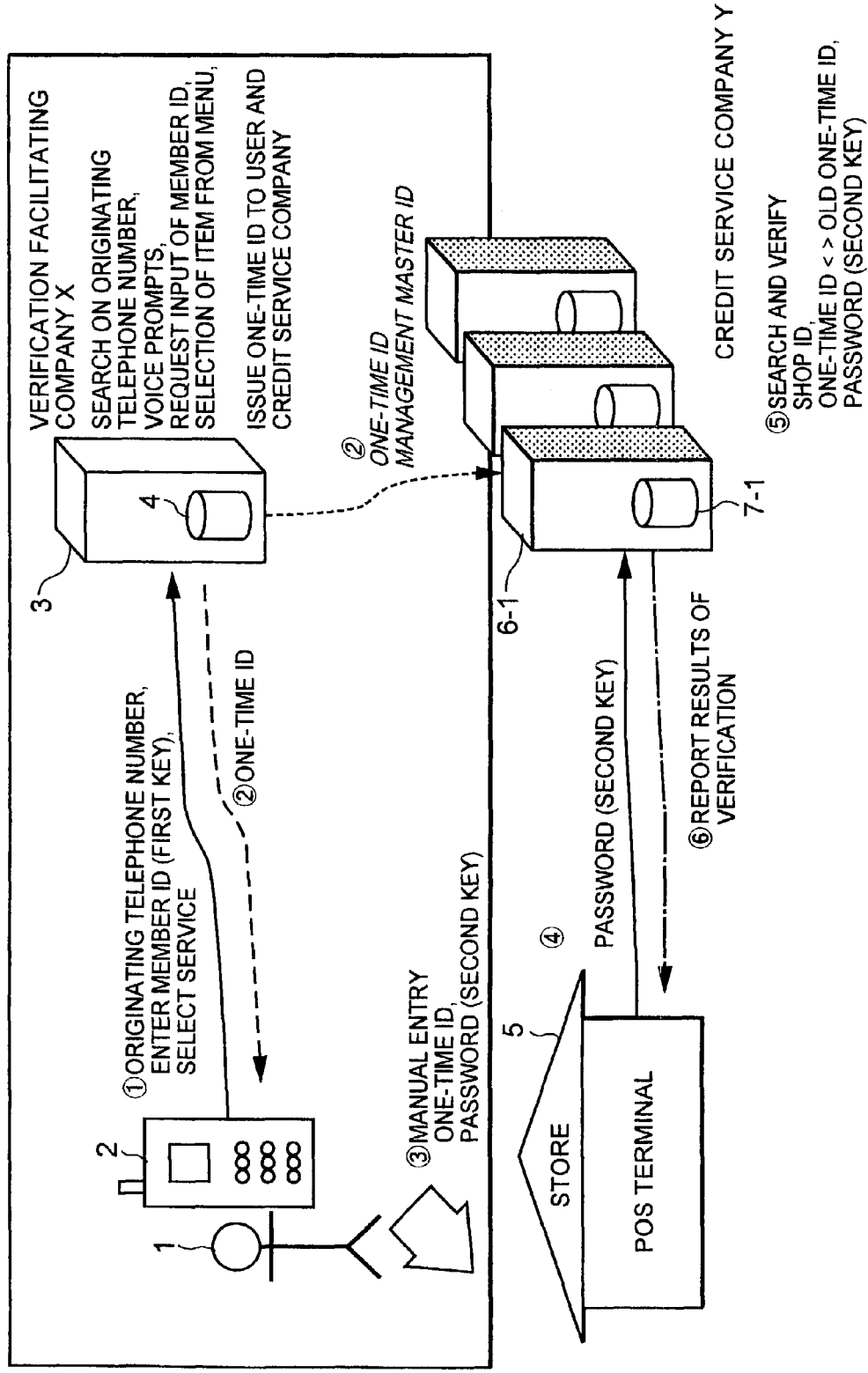
FIG. 10 is a block diagram showing a situation where a store attempts to defraud a credit service company.

FIG. 10 shows a situation where a store attempts to use a password of a user to defraud a credit service company.

Referring to FIG. 10, a store staffperson might attempt to reuse a password entered at some time in the past by user 1 at POS terminal 5, such staffperson for example requesting disbursement of funds at step ④ from verifying system 6-1 of credit service company Y. But because such staffperson cannot enter one-time ID issued to user 1, positive identification is not made at second-stage identity check performed by verifying system 6-1 at step ⑤, and such disbursement of funds is denied. Furthermore, even if such staffperson were to attempt to reuse a one-time ID entered at some time in the past by user 1 at POS terminal 5, verifying system 6-1 might immediately detect this as a fraudulent or accidental attempt at repeated use of a one-time ID as a result of comparison which it might perform between such reused one-time ID and any "used" one-time ID within database 7-1 (and/or it is possible to confirm use by user 1 based on such "used" one-time ID). Accordingly, such attempt to defraud the credit service company would fail.

Figure 11:
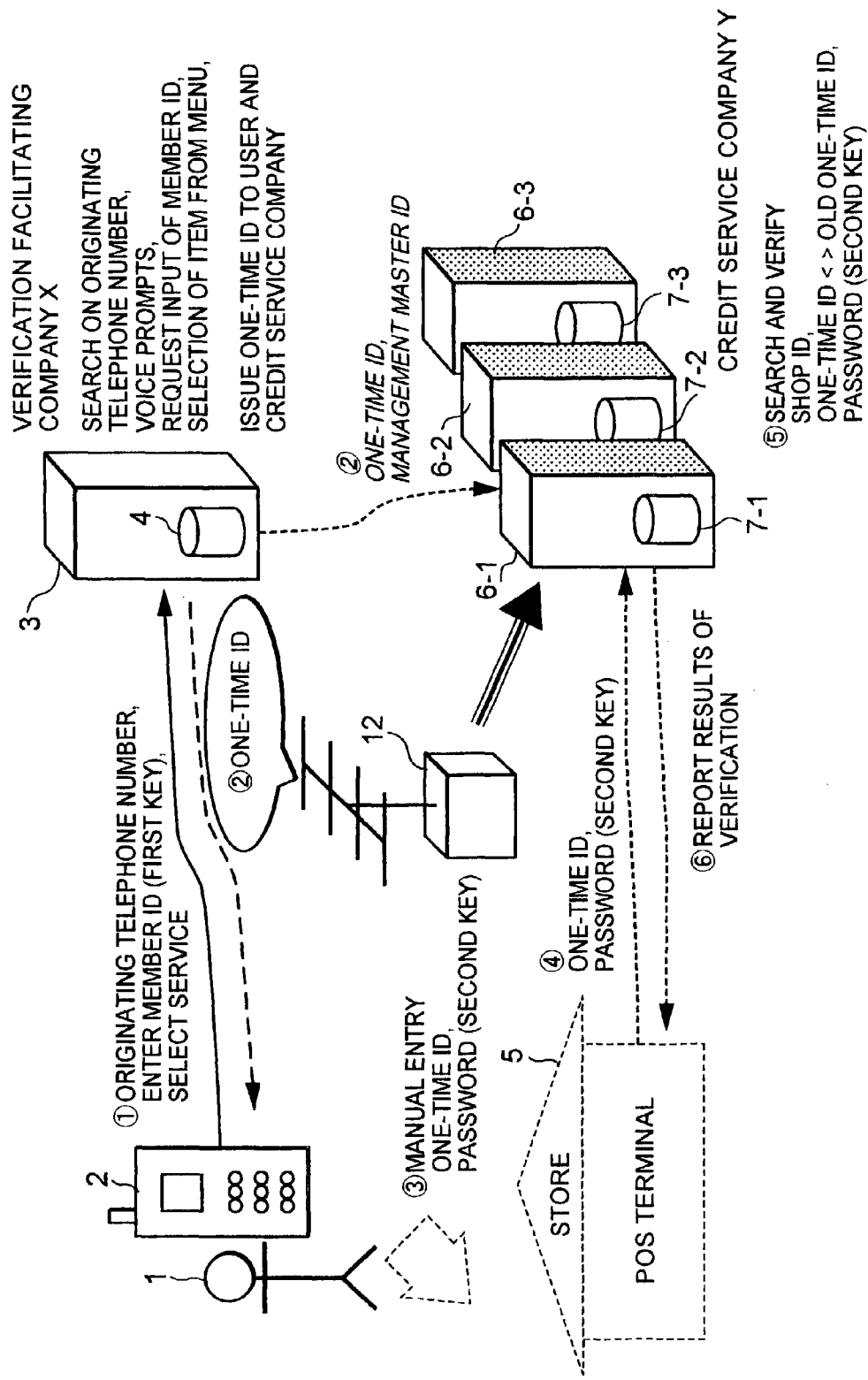
FIG. 11 is a block diagram showing a situation where a third party gains possession of data through electronic interception thereof.

FIG. 11 shows a situation in which a key is acquired by a third party through electronic interception thereof.

Referring to FIG. 11, third party 12 might intercept communication occurring between user 1 and verification facilitating system 3 at steps ① through ②, allowing such third party 12 to gain possession of a one-time ID of user 1 (or a similar example might be a situation where third party 12 gains possession of the member ID in this fashion, and acquires the one-time ID in this or some other way). But even if third party 12 manages to use the stolen one-time ID before user 1, because third party 12 does not know password of user 1, positive identification will not be made at second-stage identity check of step ⑤.

Figure 12:
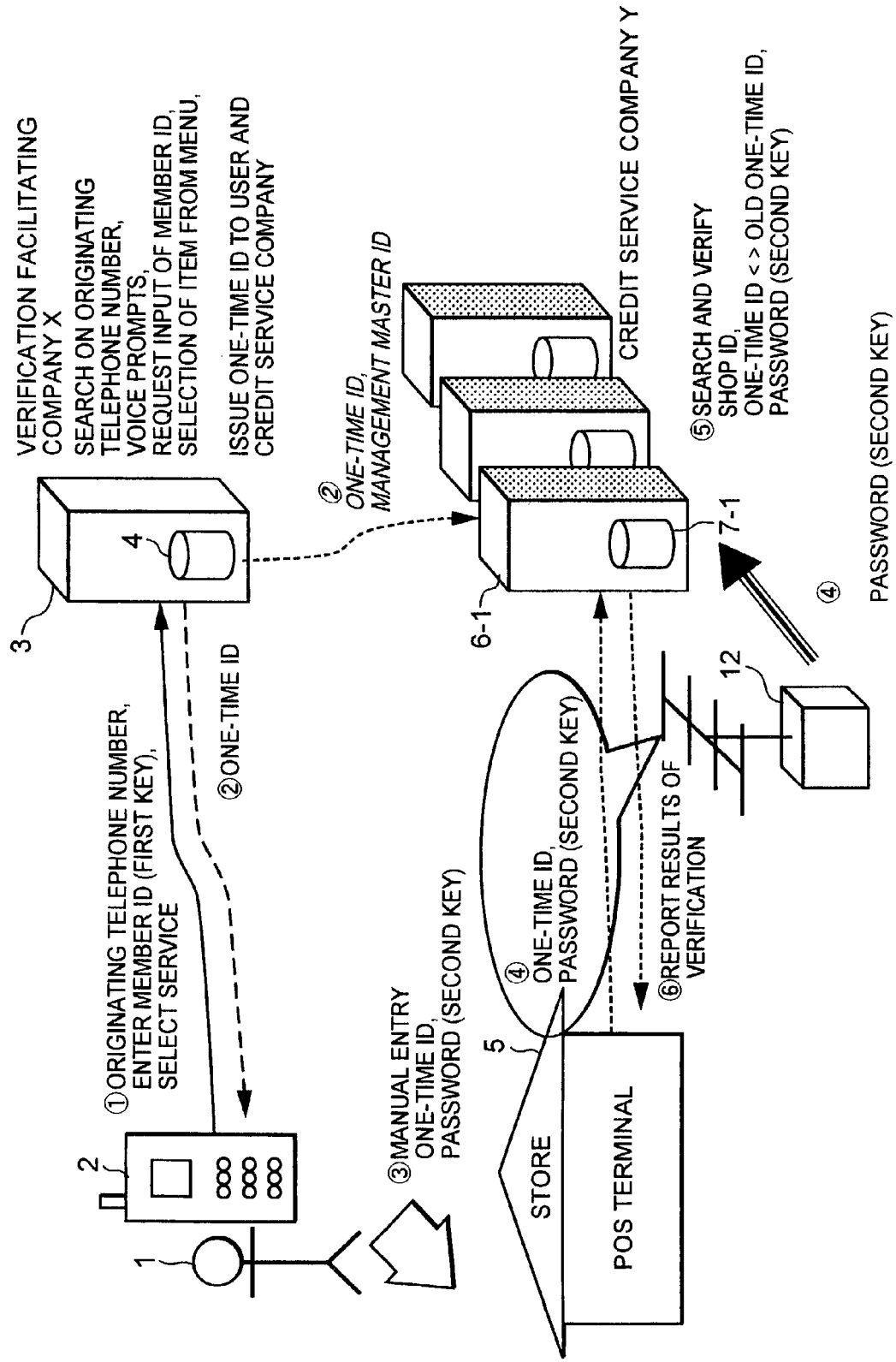
FIG. 12 is a block diagram showing another situation where a third party gains possession of data through electronic interception thereof.

FIG. 12 shows another situation involving electronic interception by a third party.

Referring to FIG. 12, third party 12 might intercept communication occurring between POS terminal 5 and verifying system 6 at step ④, allowing such third party 12 to gain possession of a one-time ID and password of user 1. But when third party 12 attempts to use the stolen one-time ID and password, because user 1 has already used that one-time ID this would represent repeated use of the same one-time ID, and positive identification will not be made at second-stage identity check of step ⑤.

This completes general description of the present embodiment. Detailed description of particular aspects of the present embodiment follows.

Figure 13:
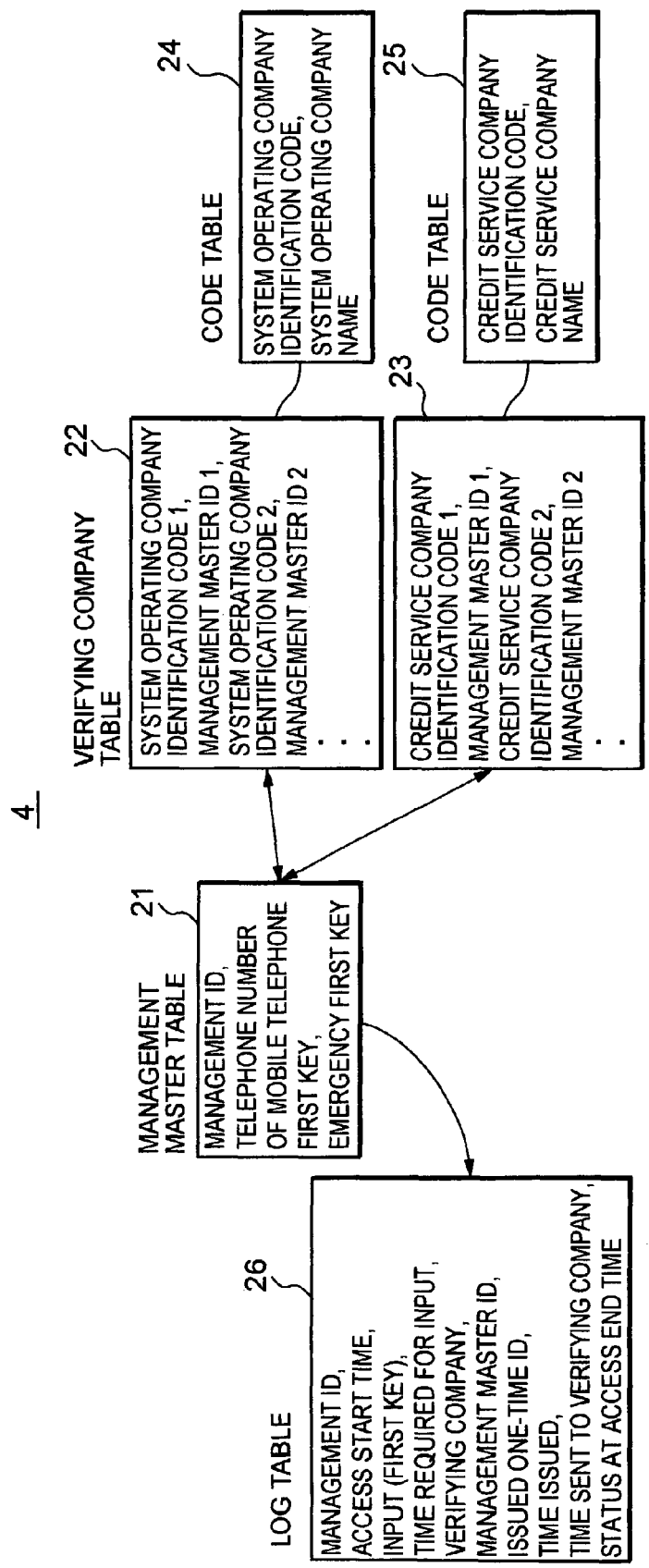
FIG. 13 is a block diagram showing constitution of a database 4 that might be associated with verification facilitating system 3.
Figure 14:
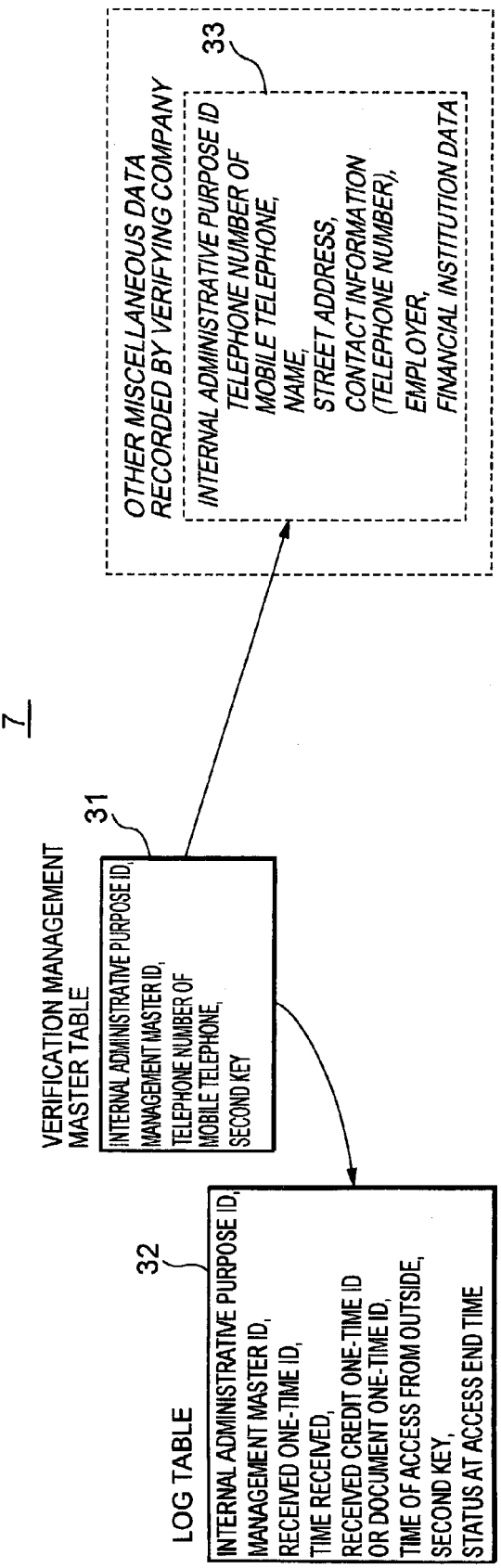
FIG. 14 is a block diagram showing constitution of a database 7 that might be associated with verifying system 6.

FIG. 13 shows the constitution of a database 4 that might be associated with a verification facilitating system 3 of a verification facilitating company X. FIG. 14 shows the constitution of a database 7 that might be associated with a verifying system 6 of a verifying company Y.

Referring to FIG. 13, database 4 of verification facilitating system 3 may contain management master table 21 wherein the following may be registered separately for each member: management ID (ID assigned to respective member for internal use by verification facilitating system 3), telephone number (originating telephone number) of mobile telephone, first key (member ID), and emergency first key (emergency member ID). As described below with reference to FIG. 23, emergency first key (emergency member ID as used herein refer to dummy member ID prepared in anticipation of the possibility that member might be forced to reveal his, her, its, and/or their member ID (first key) as a result of intimidation or other such criminal activity on the part of a third party, the idea being that such dummy member ID could be revealed to such third party instead of real member ID.

A verifying company tables 22, 23 within which may be recorded information pertaining to verifying company registered by that member may be present, in which case it may be linked to the data for each member in management master table 21. Whereas in the example shown in the drawing one such registered company table 22 contains data pertaining to a system operating companies used by the member, and another such registered company table 23 contains data pertaining to a credit service companies used by the member, the invention is of course not limited to the particular examples shown here. Each such verifying company table 22, 23, if present, may contain recorded therein, separately for each verifying company, identification code for that verifying company and management master ID assigned to the member by that verifying company. Moreover, a code tables 24, 25 within which may be recorded information of a bibliographic nature, such as identification code, name, address(es) and so forth for that verifying company, may be present, in which case it may be linked to the data for each verifying company listed within verifying company table 22, 23, if present.

Furthermore, a log tables 26 for a members may be present, in which case it may be linked to the data for each member in management master table 21, if present. Log table 26 for each member may, if present, contain recorded therein the member's management ID and access log logging access(es) to verification facilitating system 3 (e.g., access start time period, input first key (member ID), time required for input, verifying company, management master ID, issued one-time ID, issue time, time sent to verifying company, status(es) at access end time, etc.).

Referring to FIG. 14, database 7 of verifying system 6 may contain verification management master table 31 wherein the following may be registered separately for each member: the member's internal administrative purpose ID (ID assigned to the member and used only for an internal administrative purpose by verifying system), management master ID, telephone number (originating telephone number) of mobile telephone, second key (password), and so forth.

A log tables 32 for a members may be present, in which case it may be linked to the data for each member in verification management master table 31. Log table 32 for each member may, if present, contain recorded therein the member's internal administrative purpose ID and management master ID and access log logging access(es) to verifying system 6 (e.g., one-time ID received, time(es) of receipt thereof, credit one-time ID and/or document one-time ID received, access time, second key (password) received, status(es) at access end time, etc.).

In addition, data for each member within verification management master table 31, if present, may be linked to data 33 (e.g., the member's street address(es), name, contact information, information pertaining to financial institution for processing of transactions, credit card number, and/or other information necessary to carry out specific service for that member such as processing of credit transactions) for that member within other database belonging to such verifying company.

Figure 15:
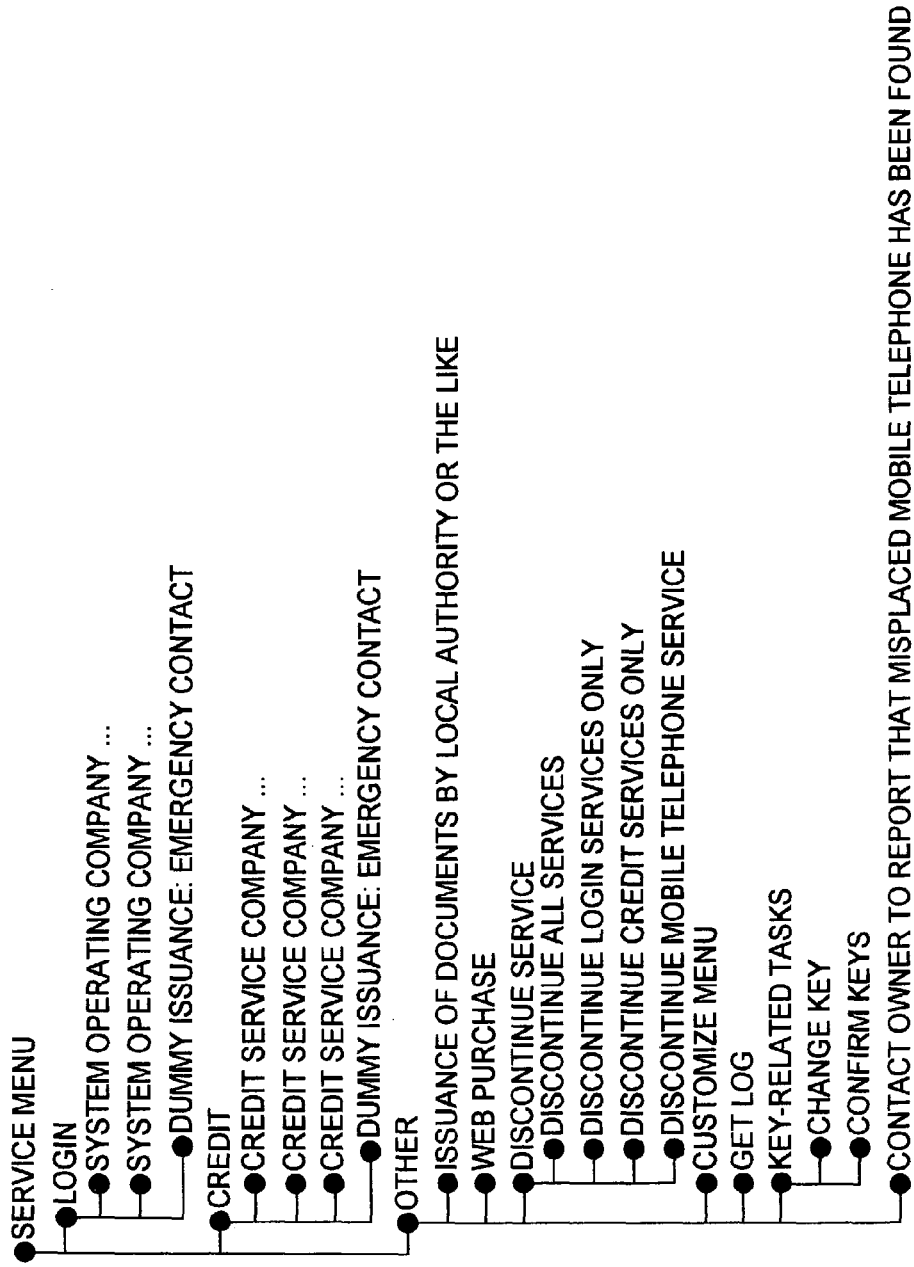
FIG. 15 is a drawing showing an example of a service menu that might be provided to mobile telephone 2 of user 1 by verification facilitating system 3.

FIG. 15 shows an example of a service menu that might be provided to mobile telephone 2 of user 1 by verification facilitating system 3.

Whereas such service menu may as shown in FIG. 15 for example have a hierarchical structure, being presented for example in the form of voice prompts, the invention is of course not limited to the particular example shown here, it being possible to present same by other methods (e.g., by display at display panel of mobile telephone 2, etc.).

Referring to FIG. 15, such service menu may contain items for selection of various applications such as those described with reference to FIGS. 3 through 6 (e.g., system operating companies carrying out login authentication, credit service companies carrying out verification for processing of credit transactions, document one-time ID issuance requests, credit one-time ID issuance requests, and/or other such selectable items). In addition, such service menu may contain items for selection of various useful functions such as those described below (e.g., service discontinuation requests, menu customization functionality, log display functionality, key management utilities, means for contacting owner in case misplaced mobile telephone is found by a third party, and/or other such selectable items).

Figure 16:
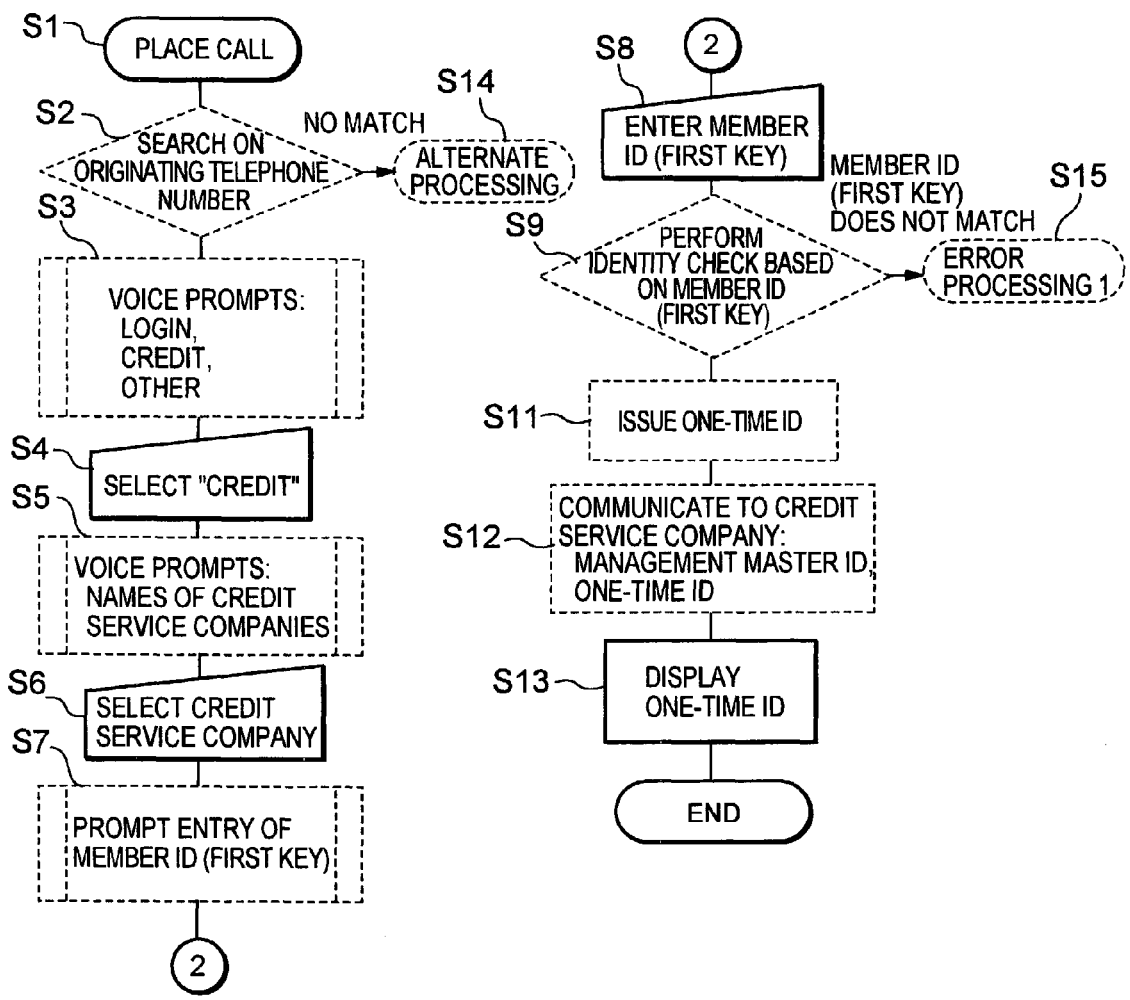
FIG. 16 is a flowchart showing a sequence of operations in connection with first-stage identity check that might be carried out by verification facilitating system 3 in the context of an exemplary application involving processing of credit transaction as shown in FIG. 3.
Figure 17:
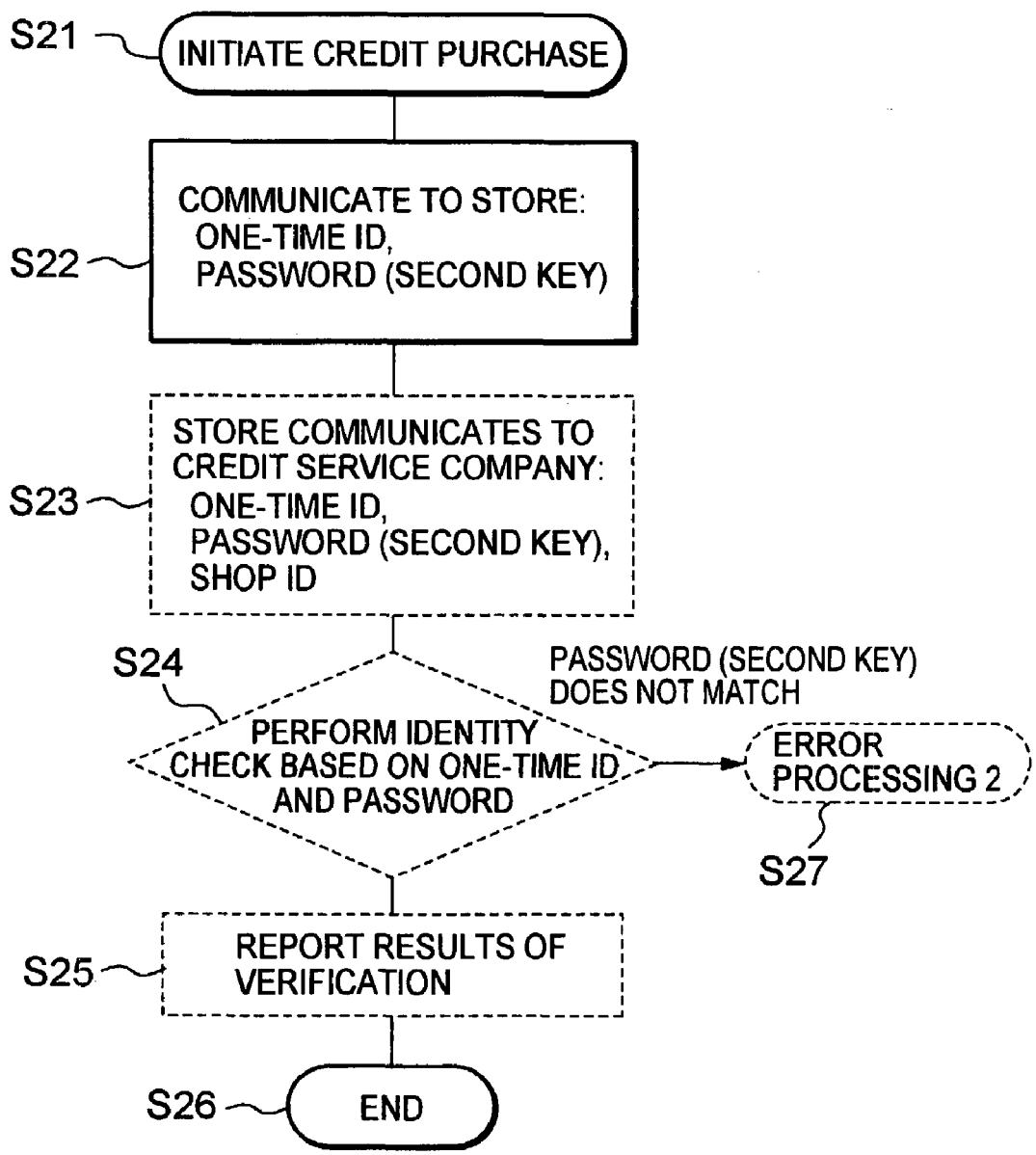
FIG. 17 is a flowchart showing a sequence of operations in connection with second-stage identity check that might be carried out by verifying system 6 in the context of an exemplary application involving processing of credit transaction as shown in FIG. 3.

FIGS. 16 and 17 show specific sequences of operations that might occur at respective components in the context of an exemplary application involving processing of credit transaction such as has been described with reference to FIG. 3, FIG. 16 showing a sequence of operations in connection with first-stage identity check that might be carried out by verification facilitating system 3 and FIG. 17 showing a sequence of operations in connection with second-stage identity check that might be carried out by verifying system 6.

At FIGS. 16 and 17, steps enclosed in solid lines indicate operations that might be performed by user 1, and steps enclosed in dashed lines indicate operations that might be performed by system associated with verification facilitating system 3, verifying system 6, (the same convention applies to FIGS. 18 through 29).

Referring to FIG. 16, upon placement of a call by user 1 to verification facilitating system 3 using mobile telephone 2 (step S1), verification facilitating system 3 compares the originating telephone number with originating telephone numbers registered to members (S2), and if a match is found, sends a service menu prepared for the matching member to mobile telephone 2 in the form of voice prompts (S3). These voice prompts prompt selection from among the service categories ("login", "credit", "other", etc.) present in the topmost level of the hierarchy of menu items shown in FIG. 15. User 1 selects "credit" from among those items (S4). Upon so doing, verification facilitating system 3 presents voice prompts for selection of a credit service company (S5), this representing a secondary menu level under "credit", and user 1 selects a desired credit service company (S6).

Verification facilitating system 3 then requests input of member ID from user 1 (S7), and user 1 enters his member ID at mobile telephone 2 and sends same to verification facilitating system 3. Verification facilitating system 3 compares the member ID received from user 1 with the member ID registered to the member found as a result of the match described above (S9), and if these match, issues a one-time ID and sends same to mobile telephone 2 of user 1 (S11), and moreover sends that one-time ID and the management master ID of the user 1 (the member found as a result of the match above) to a verifying system 6 associated with the credit service company selected by the user 1 from the service menu (S12). The issued one-time ID is displayed at a display panel on mobile telephone 2 of user 1.

Note that if a match is not found at step S2, verification facilitating system 3 carries out prescribed alternate processing (e.g., callback) (S14). Furthermore, if a match is not found at step S9, verification facilitating system 3 carries out prescribed error processing (e.g., reprompt for member ID and carry out comparison again,) (S15).

Referring to FIG. 17, when user 1, after being issued the one-time ID, wants to use credit to purchase goods at a store (S21), user 1 enters his one-time ID and password at POS terminal 5 at the store (S22), and POS terminal 5 sends the input one-time ID and password, together with the store number (shop ID) of the store, to verifying system 6 of the credit service company (S23). Verifying system 6 compares the one-time ID-password set of user 1 received from POS terminal 5 with one-time ID-password sets registered to members (S24), and if a match is found, returns a message to POS terminal 5 to the effect that positive identification has been made and begins processing the credit transaction (or alternatively, processes the credit transaction and returns any results thereof to POS terminal 5) (S25).

Note that if a match is not found at step S24, verifying system 6 carries out prescribed error processing (e.g., prompt user 1 for reentry of one-time ID,) (S27).

Figure 18:
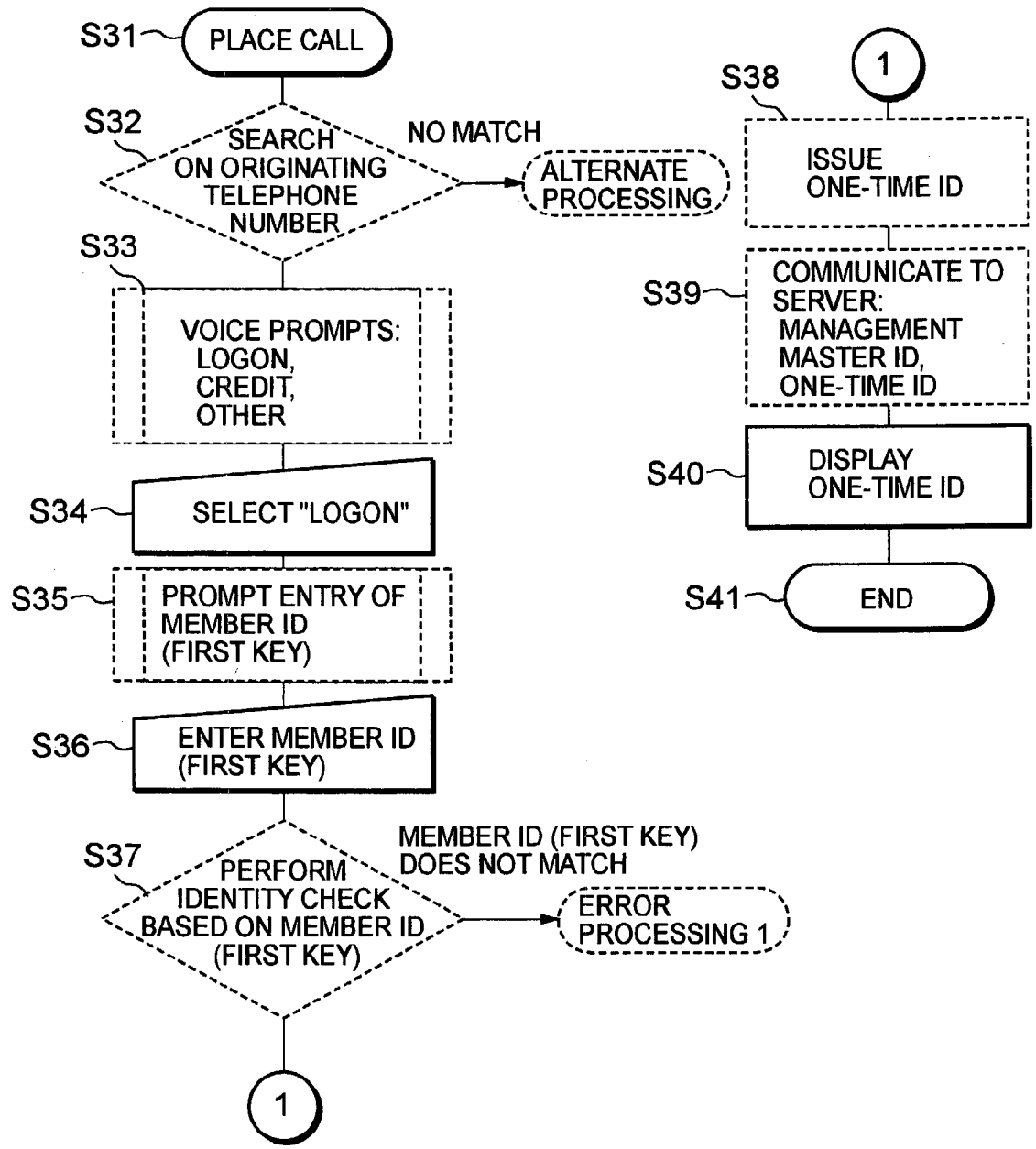
FIG. 18 is a flowchart showing a sequence of operations in connection with first-stage identity check that might be carried out by verification facilitating system 3 in the context of an exemplary application involving logging on to server as shown in FIG. 4.
Figure 19:
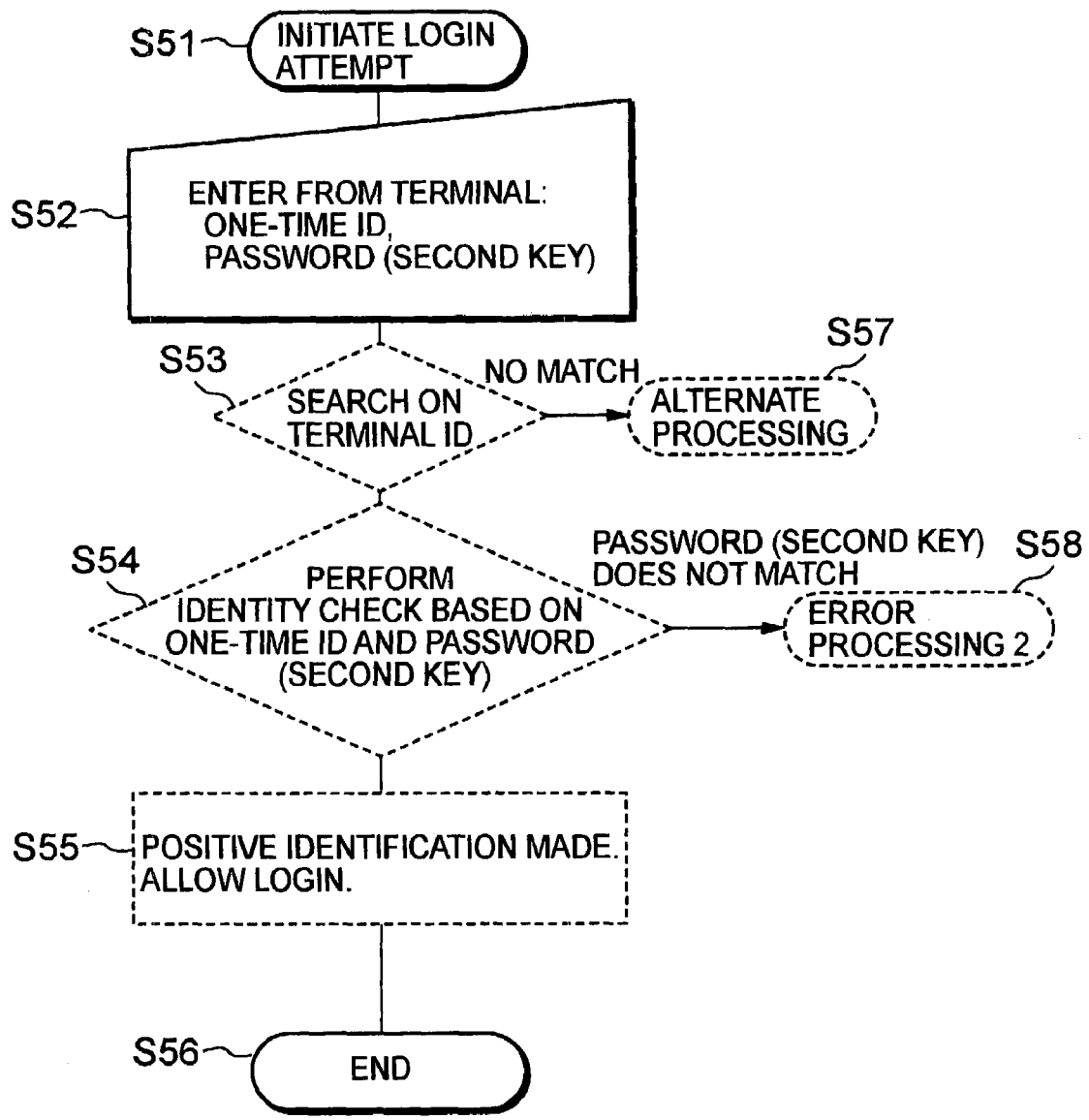
FIG. 19 is a flowchart showing a sequence of operations in connection with second-stage identity check that might be carried out by verifying system (server) 6 in the context of an exemplary application involving logging on to server as shown in FIG. 4.

FIGS. 18 and 19 show specific sequences of operations that might occur at respective components in the context of an exemplary application involving logging on to server such as has been described with reference to FIG. 4, FIG. 18 showing a sequence of operations in connection with first-stage identity check that might be carried out by verification facilitating system 3 and FIG. 19 showing a sequence of operations in connection with second-stage identity check that might be carried out by verifying system (server) 6.

The following description focuses on those aspects of the sequences of operations at FIGS. 18 and 19 which differ from the sequences of operations at FIGS. 16 and 17, described above.

Referring to FIG. 18, user 1 uses a service menu provided by verification facilitating system 3 to select the service category "login" and a desired system operating company (S34), and is issued a one-time ID (S36 through S38). The one-time ID and the management master ID of user 1 are communicated to server 6 (S34).

Referring to FIG. 19, upon entry of the one-time ID and a password at terminal 5 by user 1 (S52), terminal 5 sends the one-time ID and password, together with a terminal ID of that terminal 5, to server 6, whereupon server 6 compares the terminal ID with terminal IDs registered thereat (S53), and if a match is found, further compares the one-time ID-password set received from terminal 5 with one-time ID-password sets registered to members (S54), and if a match is found, determines that positive identification has been made, authorizing the login (S55).

Figure 20:
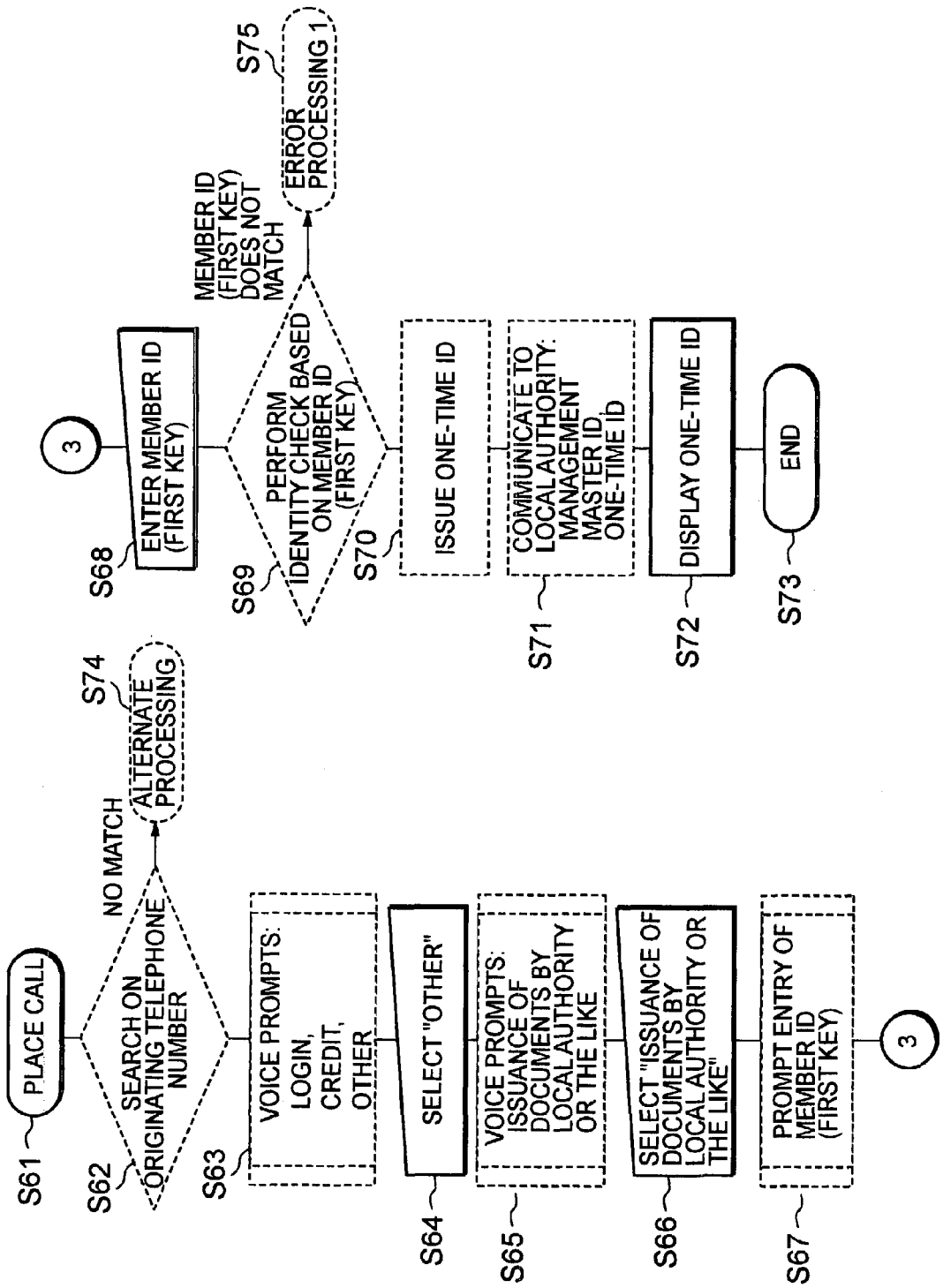
FIG. 20 is a flowchart showing a sequence of operations in connection with first-stage identity check that might be carried out by verification facilitating system 3 in the context of an exemplary application involving issuance of certificatory document by a local authority as shown in FIG. 5.
Figure 21:
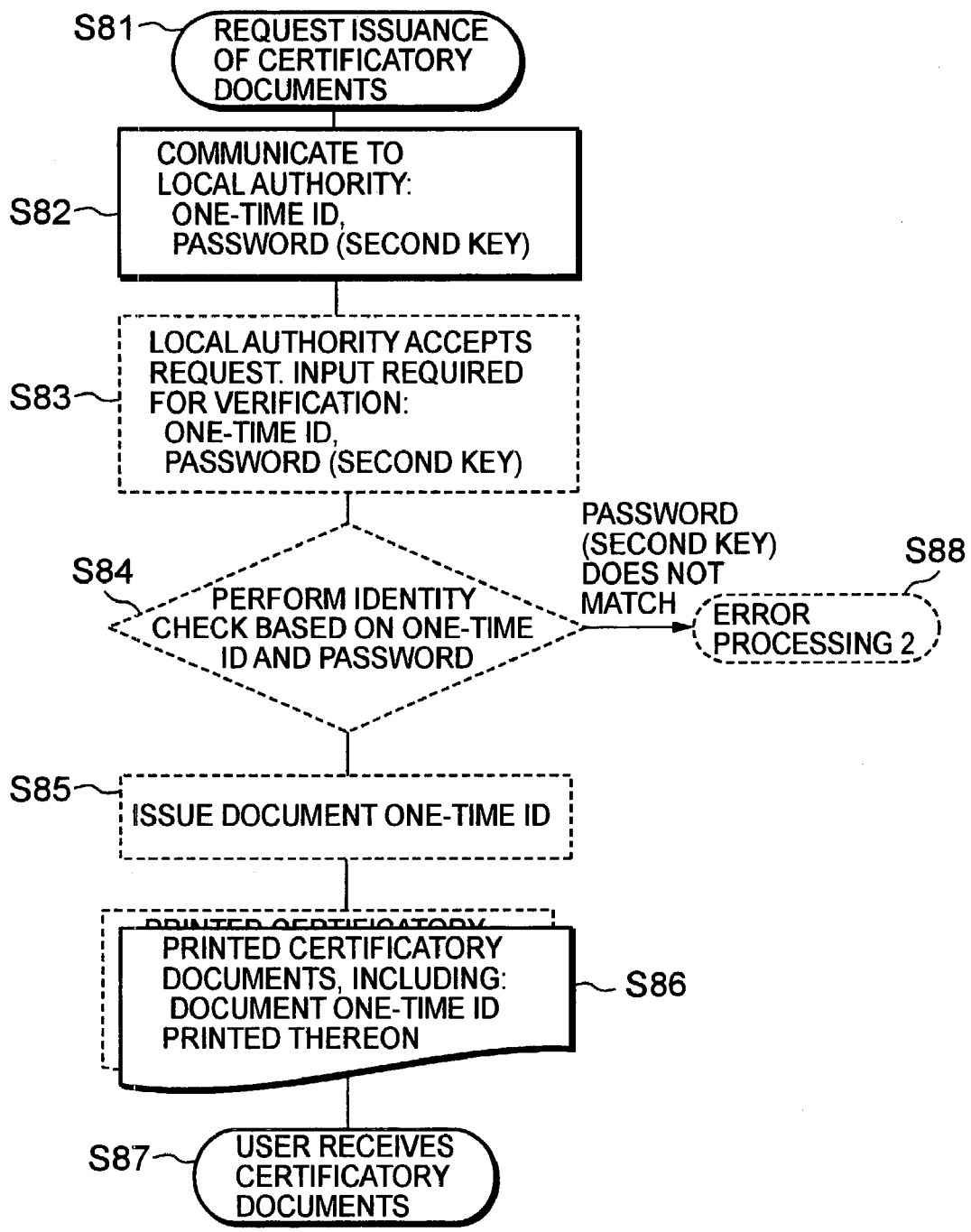
FIG. 21 is a flowchart showing a sequence of operations in connection with second-stage identity check that might be carried out by verifying system (document issuing system) 6 in the context of an exemplary application involving issuance of certificatory document by a local authority as shown in FIG. 5.
Figure 22:
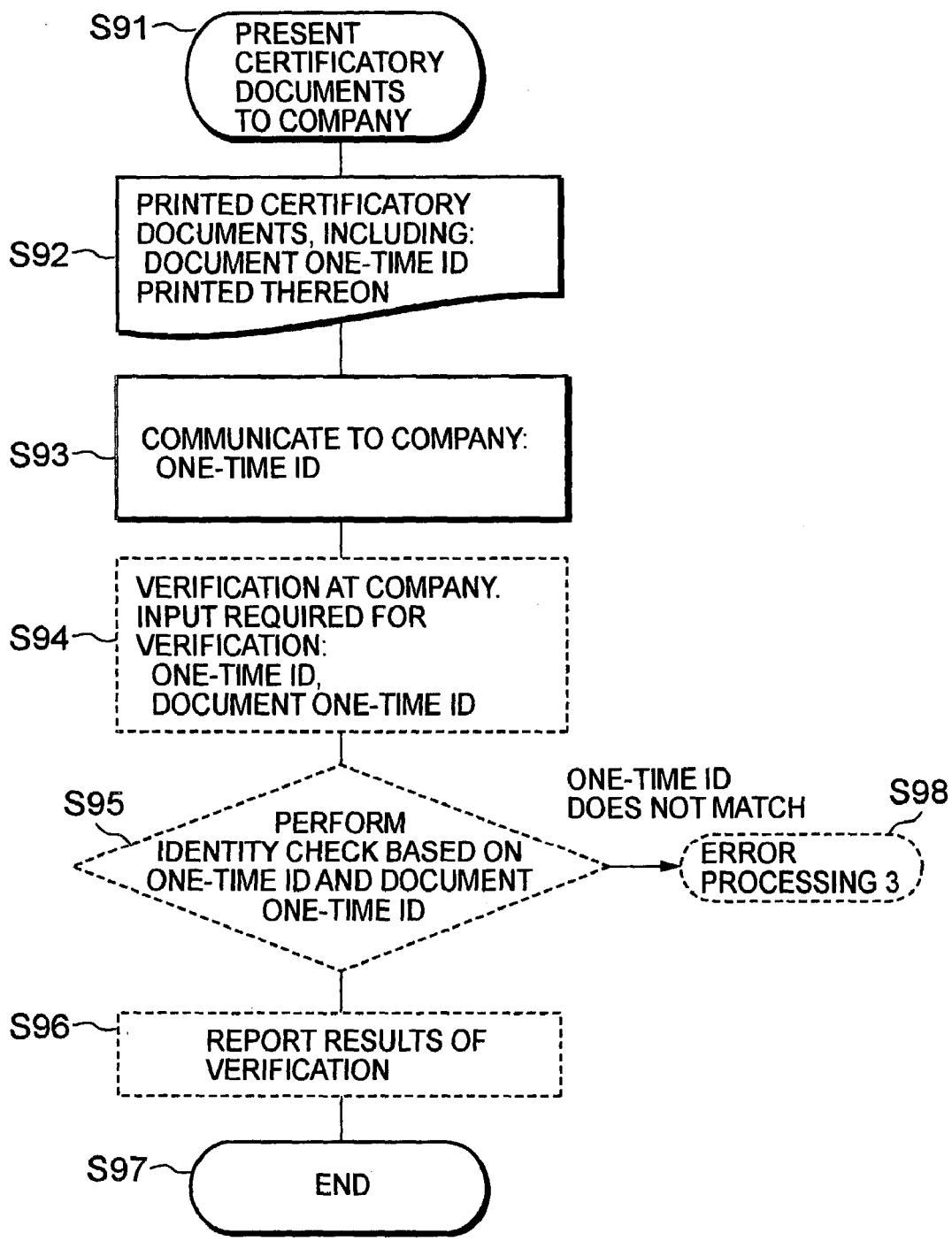
FIG. 22 is a flowchart showing a sequence of operations in connection with third-stage identity check that might be carried out by verifying system (document issuing system) 6 in the context of an exemplary application involving issuance of certificatory document by a local authority as shown in FIG. 5.

FIGS. 20 through 22 show specific sequences of operations that might occur at respective components in the context of an exemplary application involving issuance of certificatory document by a local authority such as has been described with reference to FIG. 5, FIG. 20 showing a sequence of operations in connection with first-stage identity check that might be carried out by verification facilitating system 3, FIG. 21 showing a sequence of operations in connection with second-stage identity check that might be carried out by verifying system (document issuing system) 6, and FIG. 22 showing a sequence of operations in connection with third-stage identity check that might be carried out by verifying system (document issuing system) 6.

The following description focuses on those aspects of the sequences of operations at FIGS. 20 through 22 which differ from the sequences of operations at FIGS. 16 and 17, described above.

Referring to FIG. 20, user 1 uses a service menu provided by verification facilitating system 3 to select the service category "other" and the subcategory "issuance of documents by local authority" (S64, S66), and is issued a one-time ID (S67 through S70). The one-time ID and the management master ID of user 1 are communicated to document issuing system 6 associated with such local authority (S71).

Referring to FIG. 21, user 1, after being issued the one-time ID, submits a request for issuance of documents to a local authority (S81), at which time user 1 informs the local authority of his one-time ID and password (S82), whereupon a staffperson at the local authority enters the one-time ID and password at the document issuing system 6 (S83) (or at steps S82 through S83, user 1 himself enters the one-time ID and password at document issuing system 6). Document issuing system 6 compares the one-time ID-password set received from user 1 with one-time ID-password sets registered to members (S84), and if a match is found, issues a document one-time ID (S85) and prints out the certificatory documents, with the document one-time ID being moreover printed thereon (S86). User 1 receives the certificatory documents (S87).

Referring to FIG. 22, user 1 presents the certificatory documents to a prescribed company making use of same (S91, S92), and moreover informs this company of his one-time ID (S93), whereupon an employee of the company enters at terminal 5 of that company the one-time ID of the user 1 and the document one-time ID printed on the certificatory documents which were presented thereto and forwards same to document issuing system 6 of the local authority (S94). Document issuing system 6 compares the set comprising the one-time ID of user 1 and the document one-time ID from the documents which were presented, this set having been received from terminal 5, with one-time ID-document one-time ID sets registered to members (S95), and if a match is found, returns a message to terminal 5 of the company to the effect that positive identification has been made (S96).

Figure 23:
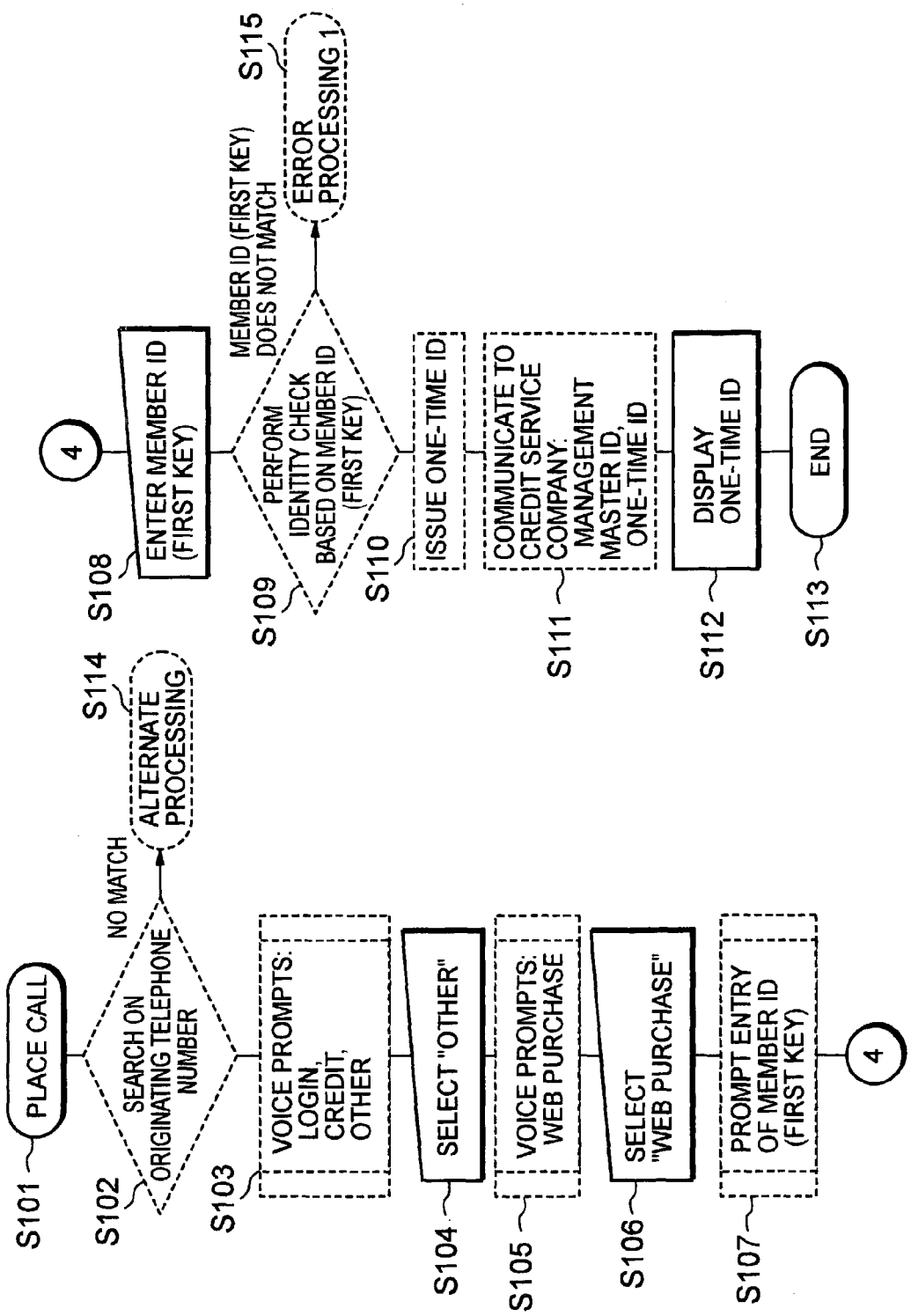
FIG. 23 is a flowchart showing a sequence of operations in connection with first-stage identity check that might be carried out by verification facilitating system 3 in the context of an exemplary application involving processing of credit transaction when making purchase during web shopping as shown in FIG. 6.
Figure 24:
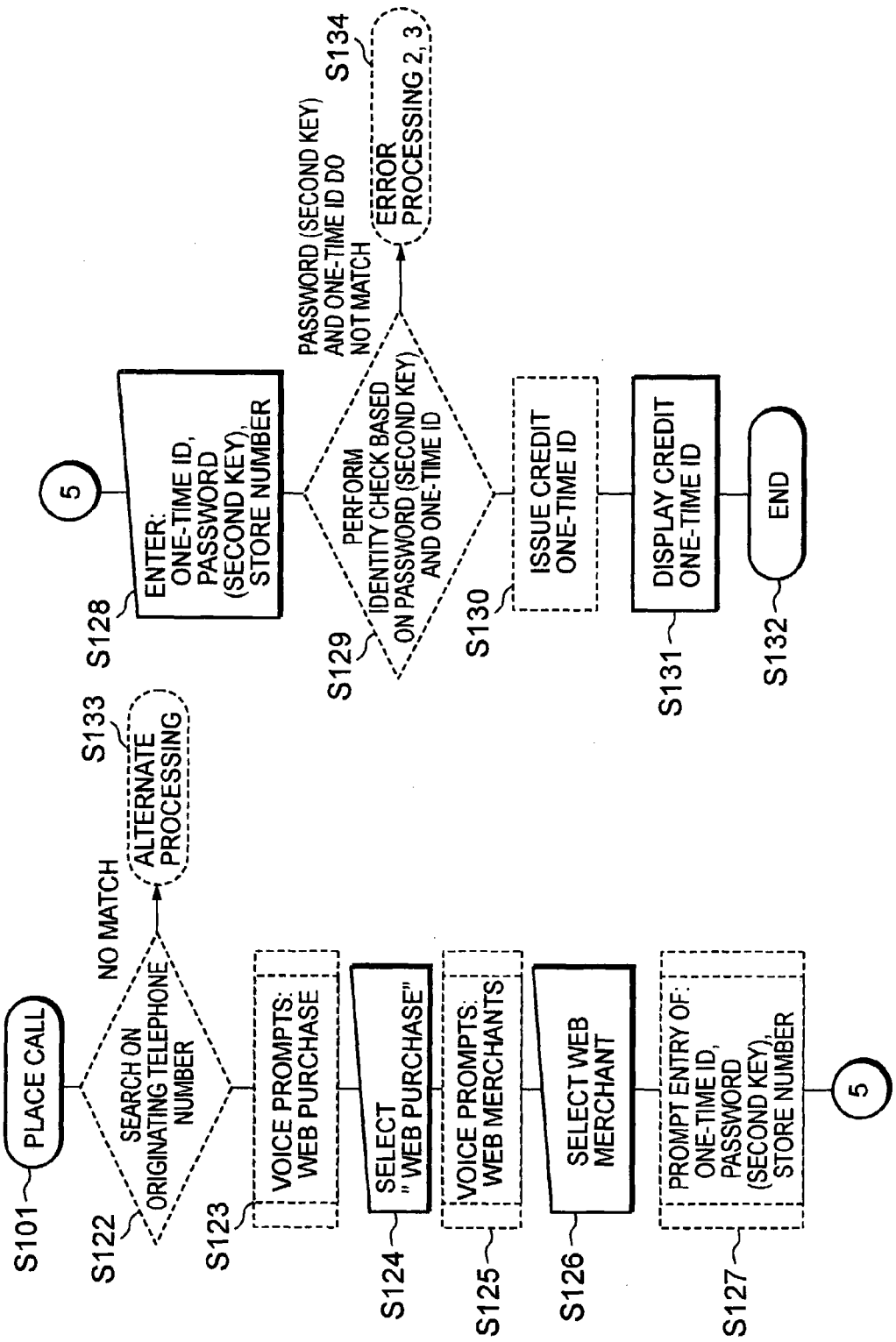
FIG. 24 is a flowchart showing a sequence of operations in connection with second-stage identity check that might be carried out by verifying system 6 of credit service company in the context of an exemplary application involving processing of credit transaction when making purchase during web shopping as shown in FIG. 6.
Figure 25:
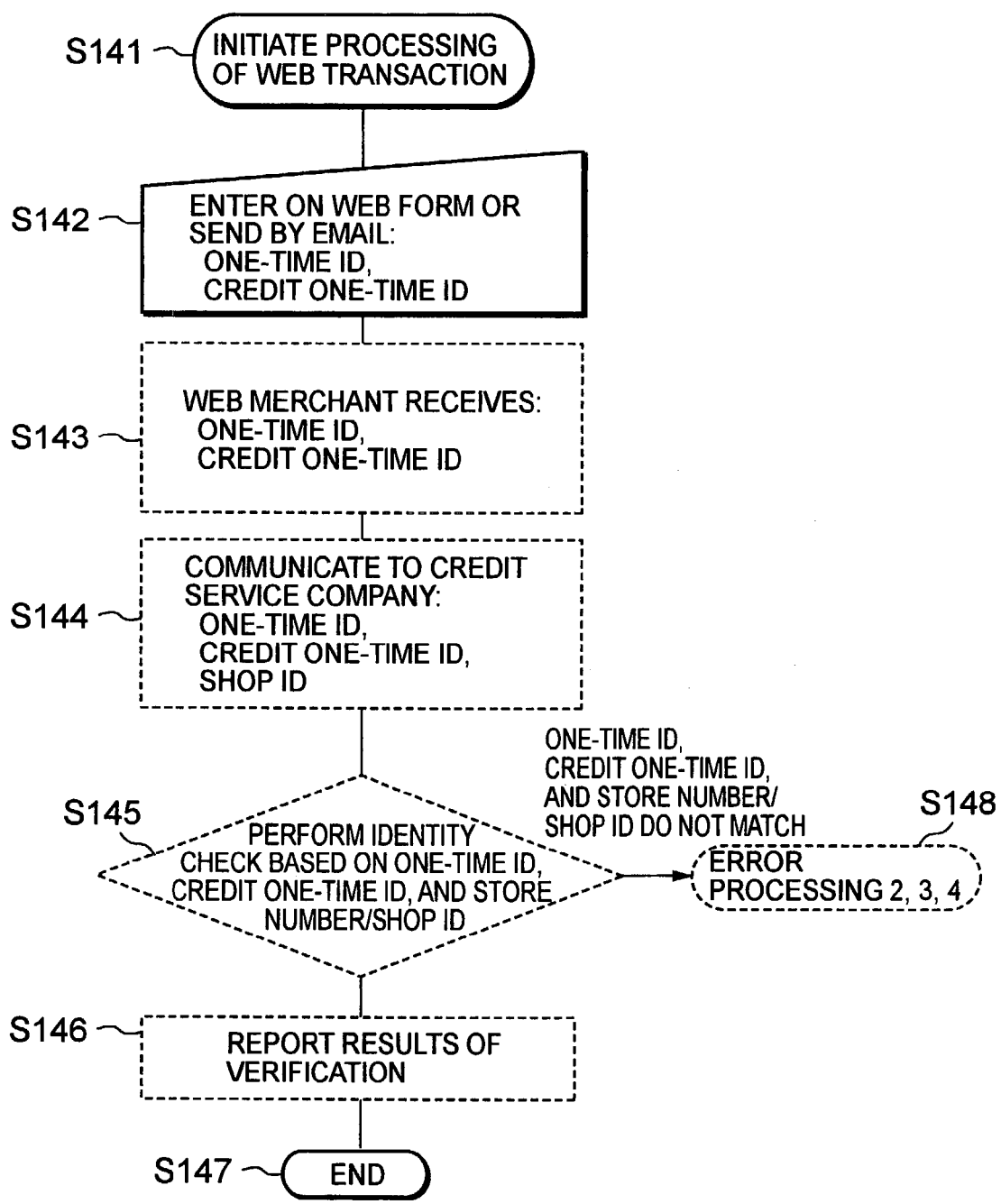
FIG. 25 is a flowchart showing a sequence of operations in connection with third-stage identity check that might be carried out by verifying system 6 of credit service company in the context of an exemplary application involving processing of credit transaction when making purchase during web shopping as shown in FIG. 6.

FIGS. 23 through 25 show specific sequences of operations that might occur at respective components in the context of an exemplary application involving processing of credit transaction when making purchase during web shopping such as has been described with reference to FIG. 6, FIG. 23 showing a sequence of operations in connection with first-stage identity check that might be carried out by verification facilitating system 3, FIG. 24 showing a sequence of operations in connection with second-stage identity check that might be carried out by verifying system 6 of credit service company, and FIG. 25 showing a sequence of operations in connection with third-stage identity check that might be carried out by verifying system 6 of credit service company.

The following description focuses on those aspects of the sequences of operations at FIGS. 23 through 25 which differ from the sequences of operations at FIGS. 16 and 17, described above.

Referring to FIG. 23, user 1 uses a service menu provided by verification facilitating system 3 to select the service category "other" and the subcategory "web purchase" (S104, S106), and is issued a one-time ID (S107 through S110).

Referring to FIG. 24, after being issued the one-time ID, user 1 uses his mobile telephone 2 to access verifying system 6 of a credit service company (S121). Verifying system 6 compares the originating telephone number of user 1 with originating telephone numbers registered to members (S122), and if a match is found, sends a service menu prepared for the matching member to mobile telephone 2 in the form of voice prompts (S123). These voice prompts prompt selection from among various types of transactions for which the user might desire processing as a credit transaction (e.g., electronic purchases or any of various other types of business transactions). User 1 selects "web purchase" from among those items (S124). Upon so doing, verifying system 6 presents voice prompts for selection among various web merchants which support credit transactions (S125), and user 1 selects a desired web merchant (S126).

Verifying system 6 then requests input of the one-time ID and password from user 1 (S127), and user 1 uses mobile telephone 2 to enter the one-time ID and password and store number of the web merchant and send same to verifying system 6 (S128). Verifying system 6 compares the one-time ID-password set which was input by user 1 with one-time ID-password sets registered to members (S129), and if a match is found, issues a credit one-time ID and sends same to mobile telephone 2 of user 1 (S130). The issued credit one-time ID is displayed at a display panel on mobile telephone 2 of user 1.

Referring to FIG. 25, after making a purchase from web merchant 9, user 1 proceeds to a web page at which he completes a procedure to initiate processing of an online transaction (S141), inputting his one-time ID and credit one-time ID at this online transaction processing web page (or alternatively sending these thereto via electronic mail) (S142). Web merchant 9 receives the one-time ID and credit one-time ID (S143), and forwards the one-time ID and credit one-time ID, together with the store number (shop ID) of same merchant, to verifying system 6 of a credit service company (S144). Verifying system 6 compares the one-time ID-credit one-time ID-store number set received from web merchant 9 with one-time ID-credit one-time ID-store number sets registered to members (S145), and if a match is found, informs web merchant 9 that positive identification has been made and begins processing the credit transaction (or alternatively, processes the credit transaction and informs web merchant 9 of the result) (S146).

Figure 26:
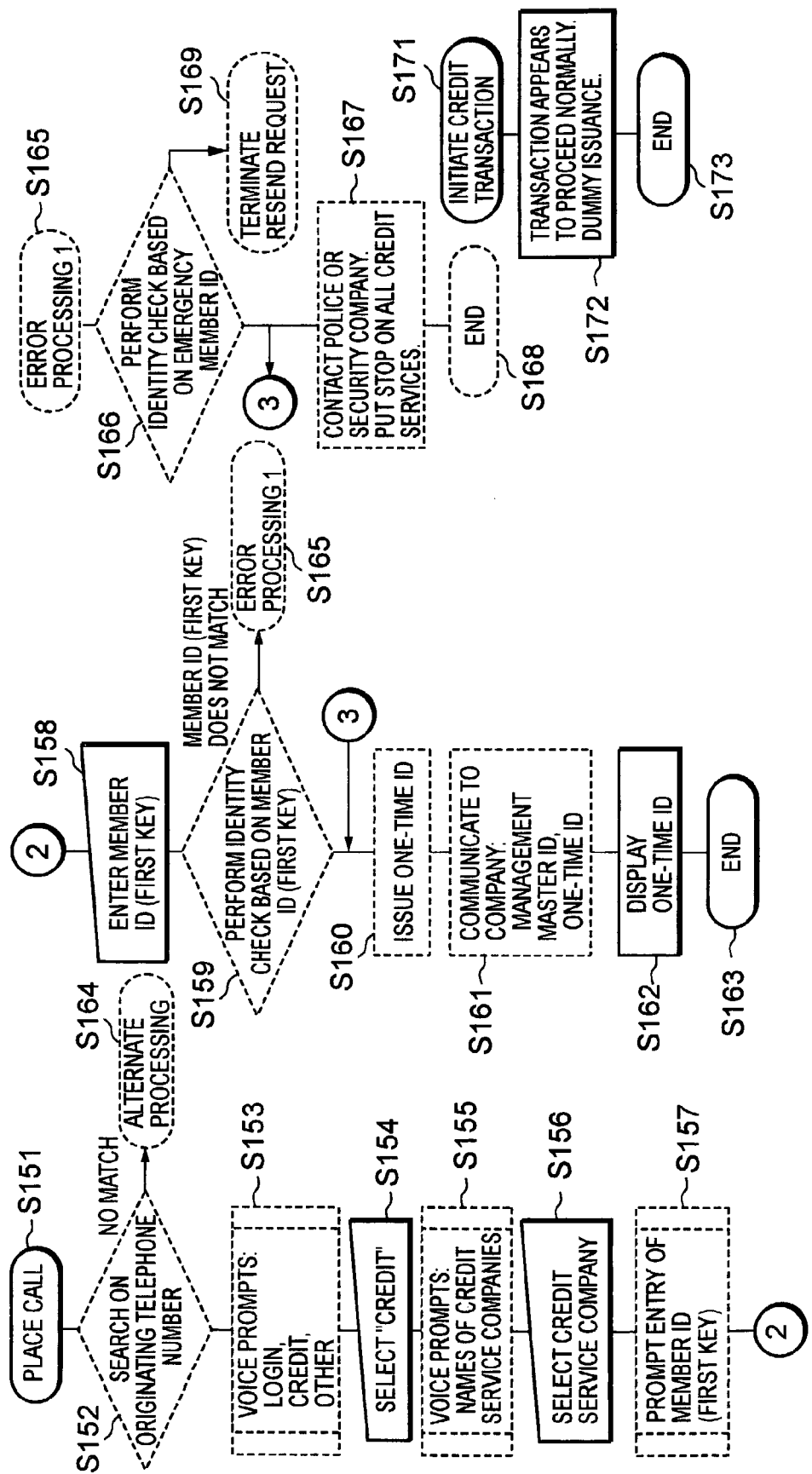
FIG. 26 is a flowchart showing a sequence of operations that might occur during emergency communication using an emergency member ID and dummy verification processing.

FIG. 26 shows a sequence of operations that might occur during emergency communication using an emergency member ID and dummy verification processing.

Such emergency communication and dummy verification processing is an effective countermeasure which may be applied for example in the event that user 1 is forced to reveal his key or to make a credit transaction as a result of intimidation or other such criminal activity.

The following description focuses on those aspects of the sequence of operations at FIG. 26 which differ from the sequences of operations at FIGS. 16 and 17, described above.

Referring to FIG. 26, upon being prompted by verification facilitating system 3 to enter his member ID (S157), user 1 enters an emergency member ID, acquired in advance in anticipation of such a possibility and different from his real member ID, at mobile telephone 2 and sends same to verification facilitating system 3 (S158). When verification facilitating system 3 receives an emergency member ID, since the result of the member ID comparison performed at step S159 will be that no match is found, processing will proceed to the error processing of step S165. During such error processing, verification facilitating system 3 compares the emergency member ID received from user 1 with the emergency member IDs registered to members (S166), and if a match is found, causes processing to proceed to step S160, where a one-time ID is issued in the same manner as with normal processing, and in addition causes processing to proceed to step S167, where information pertaining to user 1 is reported to the police or a security company and appropriate action is requested therefrom, and where all credit service companies capable of being used by user 1 are furthermore requested to carry out processing to terminate ability of user 1 to use credit services. Note that if a match is not found at step S166, verification facilitating system 3 requests repeated communication from user 1 and terminates the communication (S169).

Since user 1 is able to obtain a one-time ID, user 1 uses that one-time ID to carry out procedures in connection with processing of the credit transaction in the same manner as described with reference to FIG. 17 (S171). At such time, verifying system 6 of the credit service company and the POS terminal of the store engage in operations that to all outward appearances make it seem to the user 1 and any onlooker that processing of the credit transaction is proceeding as usual, when in fact a report such as will allow appropriate crime prevention measures to be carried out is being made to store personnel, the police, a security company, or other such concerned parties (S172).

Because use of an emergency member ID thus makes it possible to give the appearance that positive identification has been made when in fact processing for crime prevention is being carried out in the background, it is possible to effectively stop criminal activity while protecting the security of user 1.

Figure 27:
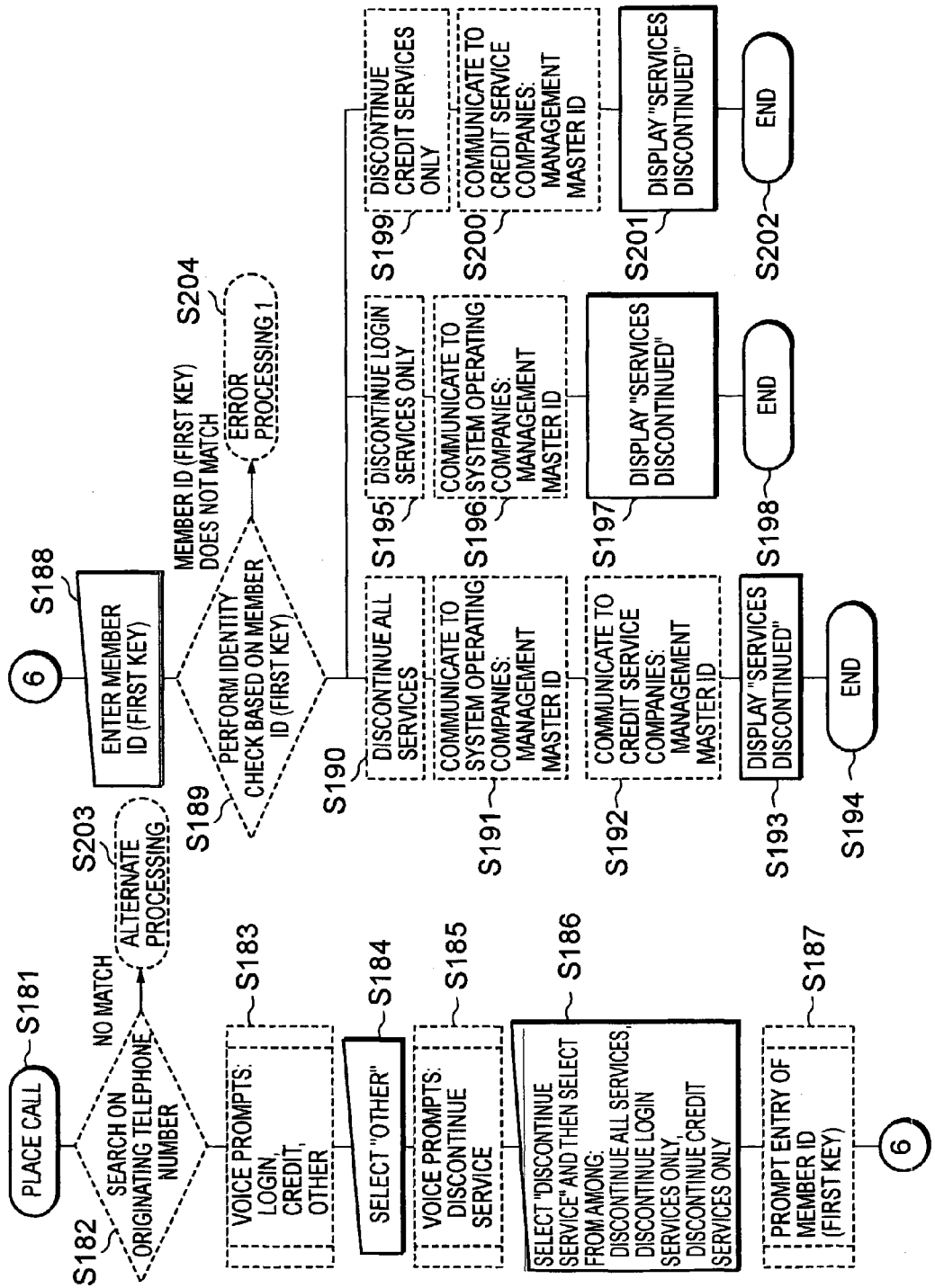
FIG. 27 is a flowchart showing a sequence of operations for discontinuing a service.

FIG. 27 shows a sequence of operations for discontinuing a service at the request of user 1.

The following description focuses on those aspects of the sequence of operations at FIG. 27 which differ from the sequences of operations at FIGS. 16 and 17, described above.

Referring to FIG. 27, after selecting "discontinue all services", "discontinue login services only", or "discontinue credit services only" under "discontinue service" under "other" from the service menu (see FIG. 15) provided by verification facilitating system 3 (S184, S186), user 1 enters his member ID (S188). If a match is found as a result of member ID comparison performed by verification facilitating system 3 at step S189, processing to discontinue all services (S190 through S194), processing to discontinue login services only (S195 through S198), or processing to discontinue credit services only (S199 through S202) is carried out in accordance with the selection of user 1. Regardless of which category of services is requested to be discontinued, all verifying companies (e.g., system operating companies, credit service companies, etc.) providing the service to be discontinued are sent the respective company's management master ID for user 1 together with a request to discontinue service (S191, S197, or S201), and in addition, a "service discontinued" message is inserted in the service menu for that user 1 at the location corresponding to the discontinued service (S201).

Figure 28:
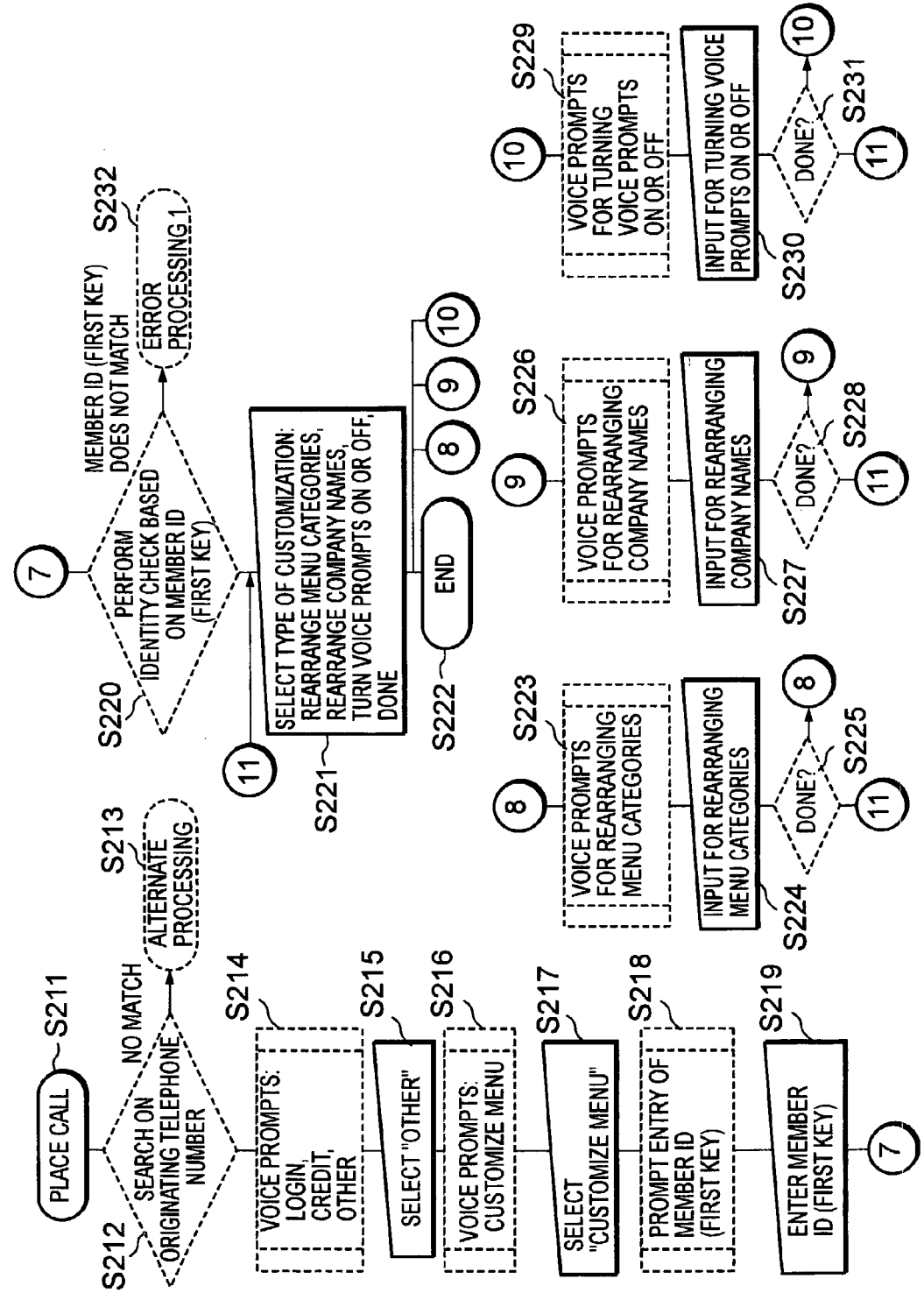
FIG. 28 is a flowchart showing a sequence of operations in connection with menu customization functionality.

FIG. 28 shows a sequence of operations in connection with menu customization functionality.

Menu customization functionality refers to the ability of user 1 to edit the order and otherwise customize presentation of menu items in a version of the service menu personalized for that user 1.

The following description focuses on those aspects of the sequence of operations at FIG. 28 which differ from the sequences of operations at FIGS. 16 and 17, described above.

Referring to FIG. 28, after selecting "customize menu" under "other" from the service menu (see FIG. 15) provided by verification facilitating system 3 (S215, S217), user 1 enters his member ID (S219). If a match is found as a result of member ID comparison performed by verification facilitating system 3 at step S220, voice prompts are presented to user 1 prompting selection of more detailed customization functionality—e.g., "rearrange menu categories", "rearrange company names", "turn voice prompts ON or OFF", "done", etc.—and user 1 selects a desired customization functionality therefrom (S221). Verification facilitating system 3 carries out processing in connection with the customization functionality selected by user 1; i.e., processing to rearrange menu categories (S223 through S225), processing to rearrange company names (S226 through S228), or processing to turn voice prompts ON or OFF (S229 through S231). Regardless of which category of customization functionality is selected, processing is such as to allow user 1 to specify what modifications he wants to make to the service menu (S224, S227, or S230). These modifications will be reflected in the way the service menu is presented the next time that it is accessed.

Figure 29:
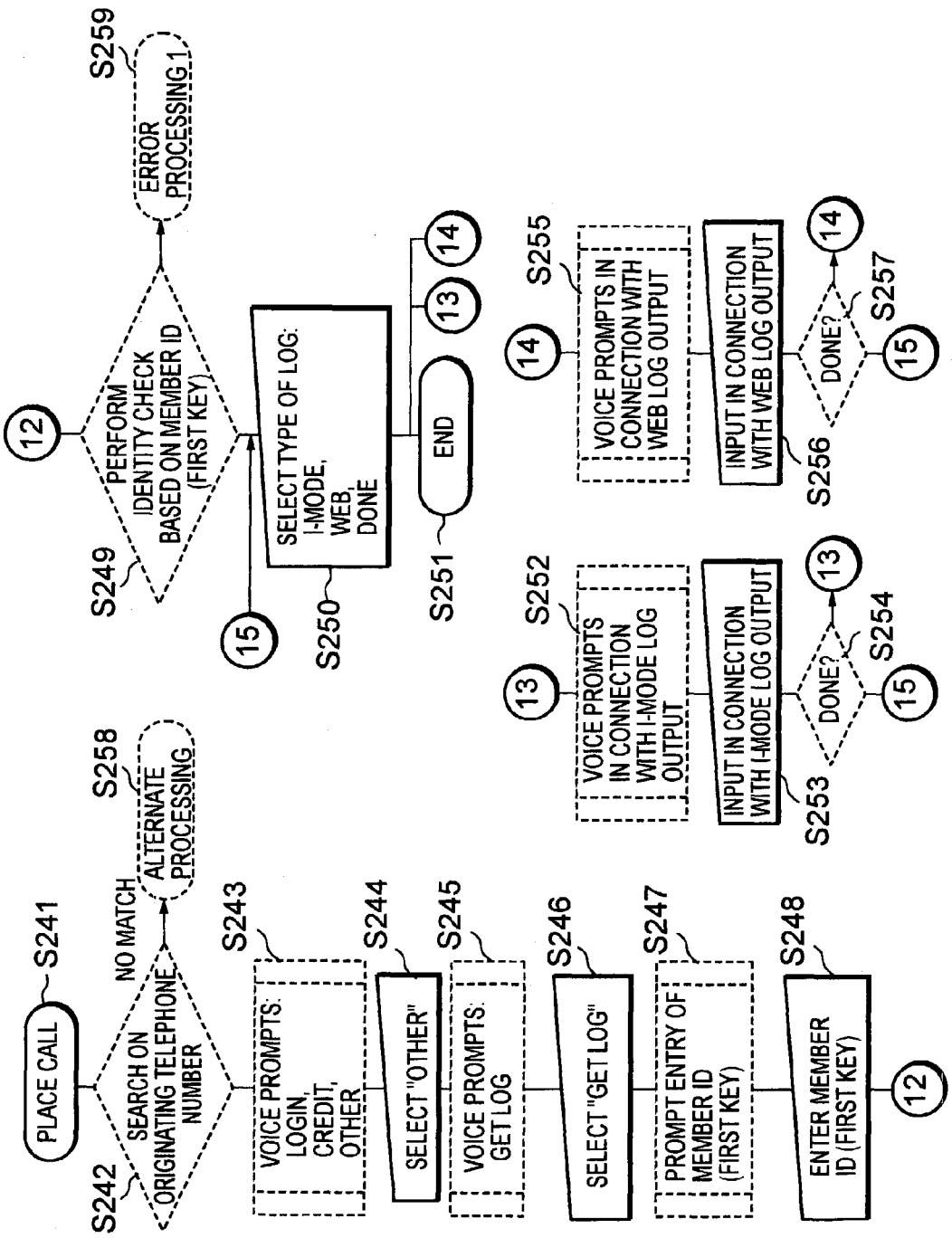
FIG. 29 is a flowchart showing a sequence of operations in connection with functionality for retrieving and displaying a log of accessed websites.

FIG. 29 shows a sequence of operations in connection with functionality for retrieving and displaying a log of websites of web merchants which have been accessed.

The following description focuses on those aspects of the sequence of operations at FIG. 29 which differ from the sequences of operations at FIGS. 16 and 17, described above.

Referring to FIG. 29, after selecting "get log" under "other" from the service menu (see FIG. 15) provided by verification facilitating system 3 (S244, S246), user 1 enters his member ID (S248). If a match is found as a result of member ID comparison performed by verification facilitating system 3 at step S249, voice prompts are presented to user 1 prompting selection of the type of log to be retrieved—e.g., "i-mode" (a service mark of NTT DOCOMO LTD. registered in Japan for Internet providing services for cellular phone), "Web", "done", etc.—and user 1 selects a desired type of log therefrom (S250). Verification facilitating system 3 performs processing to retrieve the type of log selected by user 1 and to output it to a mobile telephone of user 1; i.e., processing to retrieve and display a log of websites accessed via i-mode (S252 through S254) or processing to retrieve and display a log of websites accessed via ordinary web browser (S255 through S257).

Figure 30:
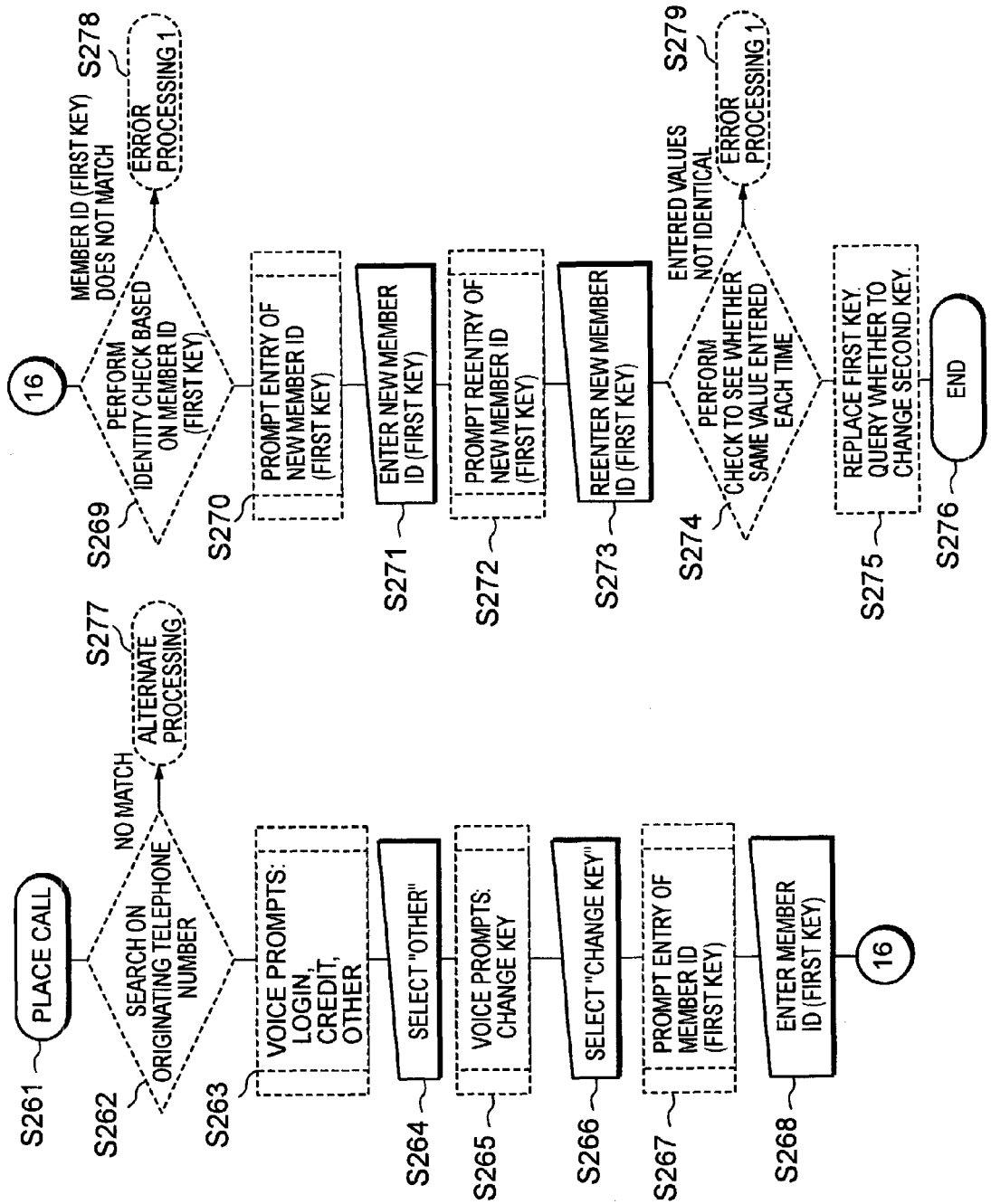
FIG. 30 is a flowchart showing a sequence of operations for changing key.

FIG. 30 shows a sequence of operations for changing key.

The following description focuses on those aspects of the sequence of operations at FIG. 30 which differ from the sequences of operations at FIGS. 16 and 17, described above.

Referring to FIG. 30, after selecting "change key" under "key-related tasks" under "other" from the service menu (see FIG. 15) provided by verification facilitating system 3 (S264, S266), user 1 enters his member ID (S268). If a match is found as a result of member ID comparison performed by verification facilitating system 3 at step S269, user 1 is prompted to enter a new member ID (first key) (S270, S272), and user 1 enters a new member ID (S271, S273). Verification facilitating system 3 then replaces the member ID registered to user 1 at database 4 with the new member ID which was entered by user 1 (S275). Furthermore, if user 1 has also requested that his password (second key) be changed, verification facilitating system 3 informs verifying system 6 of such request. While not shown in the drawings, processing for changing the password, where requested, takes place through communication between user 1 and verifying system 6 without involvement of verification facilitating system 3.

Figure 31:
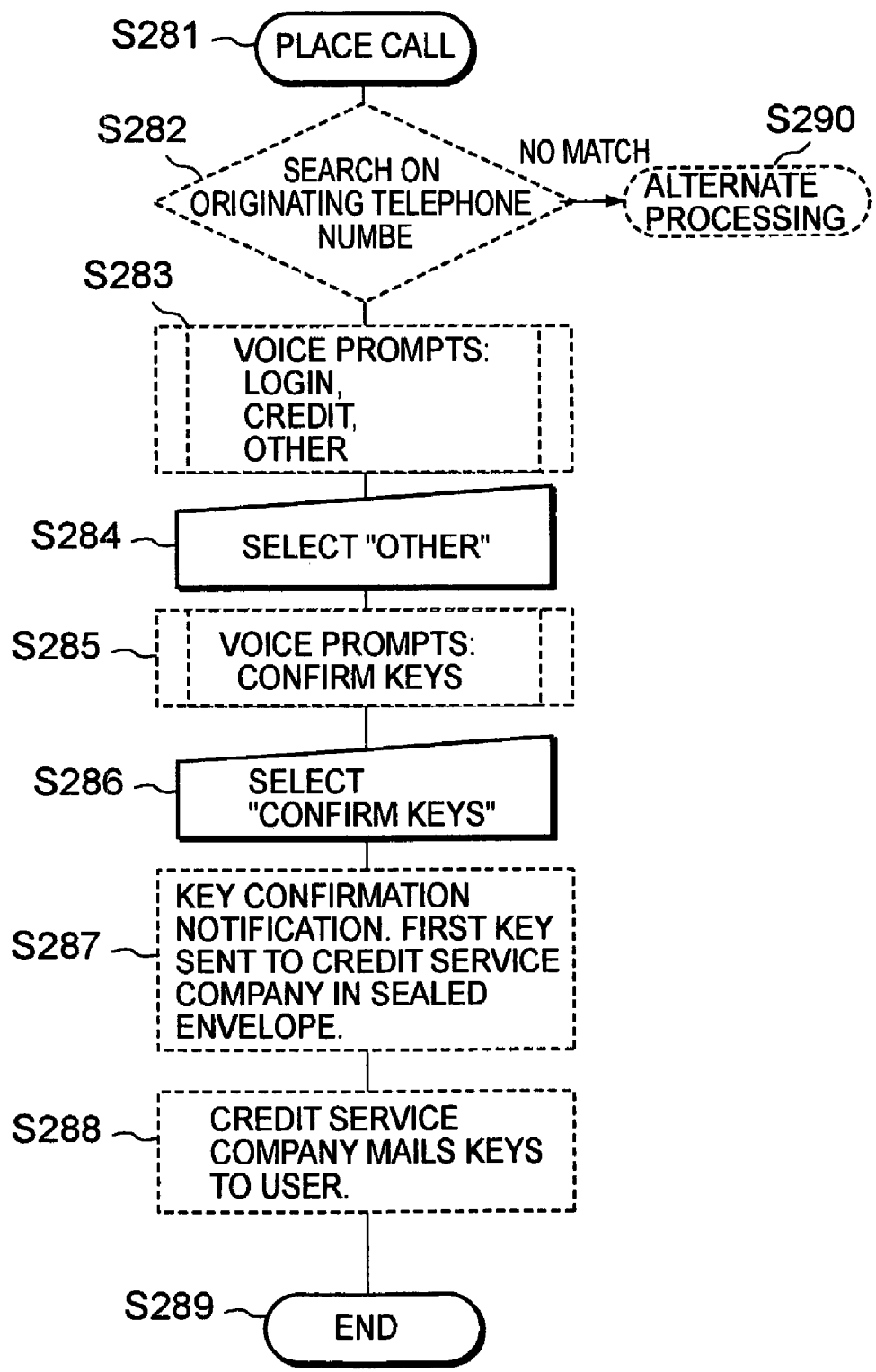
FIG. 31 is a flowchart showing a sequence of operations for receiving confirmation of key content.

FIG. 31 shows a sequence of operations for receiving confirmation of key content.

The following description focuses on those aspects of the sequence of operations at FIG. 31 which differ from the sequences of operations at FIGS. 16 and 17, described above.

Referring to FIG. 31, user 1 selects "confirm keys" under "key-related tasks" under "other" from the service menu (see FIG. 15) provided by verification facilitating system 3 (S284, S286). Upon so doing, because verification facilitating company X does not know the street address or contact information of user 1, verification facilitating company X prints out the member ID (first key) of user 1 which it places in a sealed envelope and sends to a credit service company or other such verifying company Y which does have such contact information for user 1 so as to permit such verifying company Y to inform user 1 of the content of his key (S287). Verifying company Y prints out the password (second key) of user 1, which it mails to user 1 together with the printed member ID (first key) that it received from verification facilitating company X (S288).

Figure 32:
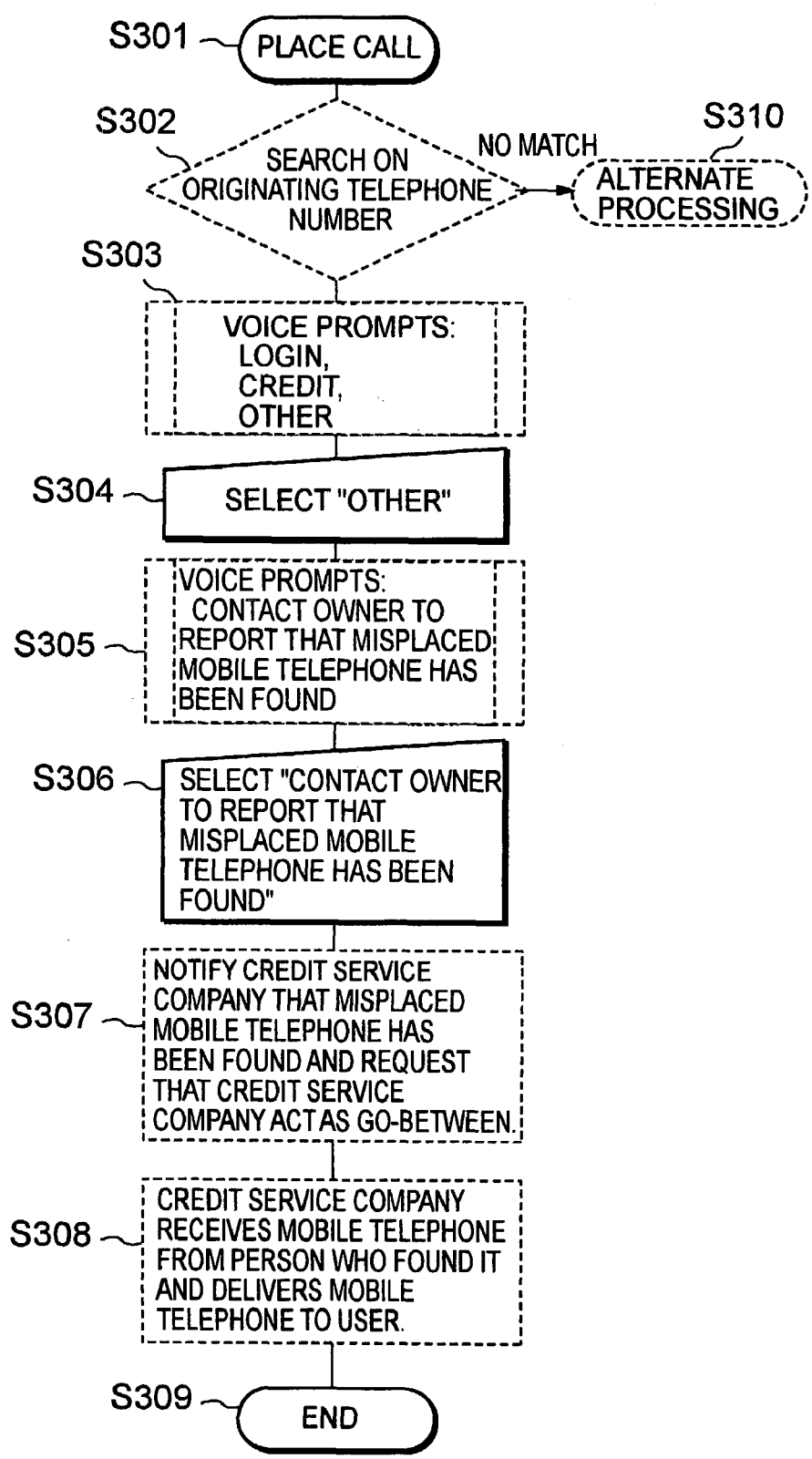
FIG. 32 is a flowchart showing a sequence of operations for contacting the owner of a misplaced mobile telephone which is found by a third party.

FIG. 32 shows a sequence of operations for contacting the owner of misplaced mobile telephone which is found by a third party.

The following description focuses on those aspects of the sequence of operations at FIG. 32 which differ from the sequences of operations at FIGS. 16 and 17, described above.

Referring to FIG. 32, a third party finding mobile telephone 2 uses that mobile telephone 2 to place a call to verification facilitating system 3 (S301), and selects "contact owner to report that misplaced mobile telephone has been found" under "other" from the service menu (see FIG. 15) provided by verification facilitating system 3 (S304, S306). Because verification facilitating company 3 does not know the street address or contact information of user 1, verification facilitating company 3 informs a credit service company or other such verifying company Y which does have such contact information for user 1 of the fact that a lost mobile telephone has been found (S307), and verifying company Y, upon being so informed, carries out processing for receipt of the mobile telephone 2 from the person who found it and delivery of same to user 1 (S308).

Whereas several embodiments of the present invention and variations thereof have been described above, these examples have been presented merely for purposes of describing the invention and it not intended that the invention should be limited thereto. The present invention may be carried out in the context of a wide variety of modes and embodiments other than those specifically presented herein.

What is claimed is:

1. A method for verifying an identity of a purported user, comprising:
   providing a first key and a second key to a user;
   providing a first system and a second system different from the first system with a management master ID of the user;
   saving the first key and the management master ID but not the second key at the first system;
   saving the second key and the management master ID but not the first key at the second system; and
   after the first key and second key providing and savings steps:
      transmitting to the first system from a purported user a purported first key but not a purported second key;
      receiving at the first system the purported first key from the purported user;
      comparing at the first system the purported first key to the first key;
      confirming at the first system that the purported first key matches the first key;
      if matching of the purported first key with the first key is confirmed, issuing at the first system a one-time ID associated with the purported user to the purported user;
      associating the one-time ID with the management master ID of the user at the first system;
      transmitting the one-time ID associated with the management master ID of the user from the first system to the second system;
      saving the one-time ID associated with the management master ID of the user at the second system;
      transmitting to the second system from the purported user a purported second key and a purported one-time ID but not the purported first key;
      receiving at the second system the purported second key and the purported one-time ID from the purported user;
      comparing at the second system the purported second key to the second key;
      comparing at the second system the purported one-time ID to the one-time ID;
      confirming at the second system that purported second key matches the second key;
      confirming at the second system that the purported one-time ID matches the one-time ID; and
      if matching of both the purported second key with the second key and the purported one-time ID with the one-time ID is confirmed, confirming that the purported user is the user.

2. The method of claim 1, wherein the purported first key is transmitted to the first system from a mobile telephone of the purported user.

3. The method of claim 2, wherein the purported first key is transmitted with an originating telephone number of the mobile telephone of the purported user.

4. The method of claim 2, wherein the purported first key is selected on the numeric keypad of the mobile telephone of the purported user.

5. The method of claim 1, wherein the purported second key and the purported onetime ID are transmitted to the second system from a point-of-sale terminal.

6. The method of claim 1, wherein the purported second key and purported one-time ID are transmitted to the second system from a personal computer.

7. The method of claimed 1,
   wherein the first key in the purported first key are member IDs; and
   wherein the second key and purported second key are passwords.

8. The method of claim 1, wherein the first and second systems comprise databases owned by a single company.

9. The method of claim 1, wherein the first and second systems comprise databases owned by different companies.

10. The method of claim 1, further comprising:
    after the purported second key and purported one-time ID receiving step and prior to confirming that the purported user is the user:
       confirming that the purported one-time ID does not appear in a collection of previously used one-time IDs.

11. The method of claim 1, further comprising:
    saving at the first system a mobile communication terminal ID of the user; and
    after the first key and second key providing and savings steps, and after the mobile communication terminal ID saving step:
       transmitting from a mobile communication terminal of the purported user to the first system the purported first key, the mobile communication terminal being associated with a purported mobile communication terminal ID;
       comparing at the first system the purported mobile communication terminal ID to the mobile communication terminal ID; and
       confirming at the first system that the purported mobile communication terminal ID matches the mobile communication terminal ID.

12. The method of claim 11, wherein the mobile communication terminal is a mobile telephone.

13. The method of claim 12, where the mobile communication terminal ID and the purported mobile communication terminal ID are telephone numbers.

14. The method of claim 11, further comprising:
    saving at the first system a facial image of the user; and
    after the first key and second key providing and saving steps, and after the facial image saving step:
       transmitting the facial image to the mobile communication terminal of the purported user;
       wherein the transmitting of the facial image is coincident with the issuing of the one-time ID.

15. The method of claim 1, further comprising:
    after the first key and second key providing and saving steps and prior to confirming that the purported user is the user:
       issuing at the second system a second one-time ID different from the one-time ID, the second one-time ID being associated with the purported user;
       saving the second one-time ID at the second system;
       receiving at the second system a purported second one-time ID from the purported user;
       comparing at the second system the purported second one-time ID to the second one-time ID; and
       confirming at the second system that the purported second one-time ID matches the second one-time ID.

16. An apparatus for verifying an identity of a purported user, comprising:
- a first system; and
- a second system different from the first system,
- the first and second systems being configured for:
  - providing a first key and a second key to a user;
  - providing the first system and the second system with a management master ID of the user;
  - saving the first key and the management master ID but not the second key at the first system;
  - saving the second key and the management master ID but not the first key at the second system; and
  - after the first key and second key providing and saving steps:
    - transmitting to the first system from a purported user a purported first key but not a purported second key;
    - receiving at the first system the purported first key from the purported user;
    - comparing at the first system the purported first key to the first key;
    - confirming at the first system that the purported first key matches the first key;
    - if matching of the purported first key with the first key is confirmed, issuing at the first system a one-time ID associated with the purported user to the purported user;
    - associating the one-time ID with the management master ID of the user at the first system;
    - transmitting the one-time ID associated with the management master ID of the user from the first system to the second system;
    - saving the one-time ID associated with the management master ID of the user at the second system;
    - transmitting to the second system from the purported user a purported second key and a purported one-time ID but not the purported first key;
    - receiving at the second system the purported second key and the purported one-time ID from the purported user;
    - comparing at the second system the purported second key to the second key;
    - comparing at the second system the purported one-time ID to the one-time ID;
    - confirming at the second system that purported second key matches the second key;
    - confirming at the second system that the purported one-time ID matches the one-time ID; and
    - if matching of both the purported second key with the second key and the purported one-time ID with the one-time ID is confirmed, confirming that the purported user is the user.

17. The apparatus of claim 16, wherein the first and second systems are further configured for:
- saving at the first system a mobile communication terminal ID of the user; and
- after the first key and second key providing and saving steps, and after the mobile communication terminal ID saving step:
  - transmitting from a mobile communication terminal of the purported user to the first system the purported first key, the mobile communication terminal being associated with a purported mobile communication terminal ID;
  - comparing at the first system the purported mobile communication terminal ID to the mobile communication terminal ID; and
  - confirming at the first system that the purported mobile communication terminal ID matches the mobile communication terminal ID.

18. The method of claim 17, wherein the first and second systems are further configured for:
- saving at the first system a facial image of the user; and
- after the first key and second key providing and saving steps, and after the facial image saving step:
  - transmitting the facial image to the mobile communication terminal of the purported user;
  - wherein the transmitting of the facial image is coincident with the issuing of the one-time ID.

19. The apparatus of claim 16, wherein the first and second systems are further configured for:
- after the first key and second key providing and saving steps and prior to confirming that the purported user is the user:
  - issuing at the second system a second one-time ID different from the one-time ID, the second one-time ID being associated with the purported user;
  - saving the second one-time ID at the second system;
  - receiving at the second system a purported second one-time ID from the purported user;
  - comparing at the second system the purported second one-time ID to the second one-time ID; and
  - confirming at the second system that the purported second one-time ID matches the second one-time ID.

* * * * *